US008286210B2

(12) United States Patent
Boyden et al.

(10) Patent No.: US 8,286,210 B2
(45) Date of Patent: Oct. 9, 2012

(54) HDMI SWITCHING TECHNOLOGY FOR THE COUPLING OF CONSUMER ELECTRONIC CONTROL AND/OR NON-CONSUMER ELECTRONIC CONTROL DEVICES IN AN AUDIO/VISUAL ENVIRONMENT

(75) Inventors: David Boyden, Escondido, CA (US); Rafael Calderon, San Diego, CA (US); David Dykstra, San Antonio, TX (US); Koji Kawashima, Tokyo (JP); Duyet Pham, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 426 days.

(21) Appl. No.: 12/496,737

(22) Filed: Jul. 2, 2009

(65) Prior Publication Data

US 2010/0118193 A1 May 13, 2010

Related U.S. Application Data

(60) Provisional application No. 61/114,275, filed on Nov. 13, 2008.

(51) Int. Cl.

| | |
|---|---|
| ***G06F 3/00*** | (2006.01) |
| ***G06F 13/00*** | (2006.01) |
| ***H04N 5/445*** | (2006.01) |
| ***H04N 7/18*** | (2006.01) |
| ***H04N 7/16*** | (2011.01) |

(52) U.S. Cl. .............. 725/80; 725/37; 725/74; 725/135; 710/1; 710/3; 710/9; 710/10

(58) Field of Classification Search .................. 725/151
See application file for complete search history.

(56) References Cited

U.S. PATENT DOCUMENTS

| | | | | |
|---|---|---|---|---|
| 2007/0220150 | A1* | 9/2007 | Garg | 709/226 |
| 2008/0270636 | A1* | 10/2008 | Hong et al. | 710/9 |
| 2009/0248909 | A1* | 10/2009 | Hironaka et al. | 710/18 |
| 2010/0050228 | A1* | 2/2010 | Kawashima | 725/151 |

OTHER PUBLICATIONS

High-Definition Multimedia Interface specification version 1.3a, http://www.hdmi.org/download/HDMISpecification13a.pdf, Nov. 10, 2006, p. 203.

Sony Customizes BRAVIA HDTV Sets with New Link Modules, Sony press release, http://news.sel.sony.com/en/press_room, San Diego, CA, Sep. 23, 2008.

* cited by examiner

*Primary Examiner* — Justin Shepard
(74) *Attorney, Agent, or Firm* — Miller Patent Services; Jerry A. Miller; Renee Michelle Leveque

(57) ABSTRACT

A switching module, system and method facilitate communications between one or more non-CEC enabled devices and a television of an audio/visual (A/V) system. The switching module is able to accommodate both Consumer Electronic Control (CEC) enabled and non-CEC enabled devices for communication with the television. In response to user control of a user interface of the switching module, when a non-CEC enabled device is coupled to the switching module, a high definition multimedia interface (HDMI) input port of the HDMI switching module is selected and a default HDMI device type and corresponding HDMI logic address is set for the non-CEC enabled device. This information is displayed for the user by the television.

22 Claims, 21 Drawing Sheets

1100

1200

HDMI SWITCHING TECHNOLOGY FOR THE COUPLING OF CONSUMER ELECTRONIC CONTROL AND/OR NON-CONSUMER ELECTRONIC CONTROL DEVICES IN AN AUDIO/VISUAL ENVIRONMENT

PRIORITY NOTICE

This application claims priority to U.S. Provisional Patent Application No. 61/114,275 filed Nov. 13, 2008, which is hereby incorporated herein by reference.

COPYRIGHT NOTICE

A portion of the disclosure of this patent document may contain material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The invention relates generally to digital audio/visual communications. More particularly, the invention relates to facilitation of communications between one or more non-CEC enabled devices and/or one or more CEC enabled devices and a television of an audio/visual (A/V) system.

BACKGROUND

In today's digital audio/visual (A/V) systems, devices of varying types and protocols need to be in communication with a television, such as a digital television (DTV). The data signal paths provided by multiple interfaces between devices of an A/V system can and do vary in protocol and number. For example, a TV or DTV may communicate via multiple data signaling paths to the various modules connected to it, including High Definition Multimedia Interface (HDMI®) CEC, HDMI $I^2C$, HDMI Video, Universal Serial Bus (USB), Ethernet (wired or wireless), IEEE 1394 (so-called Firewire™ or I-link™), Bluetooth, and RF. HDMI®, for instance, is a digital audio/visual connector interface capable of transmitting uncompressed and compressed streams, and can provide an interface between any compatible digital audio/video (A/V) source device, or module, and a compatible digital audio and/or video monitor device, such as a TV. Using HDMI, audio, visual, status and control information may be transmitted via one cable in the system. Consumer Electronic Control (CEC) is a protocol used to control devices that are attached using HDMI. CEC features, as may be defined from time to time in the CEC Specification, include routing control, standby, system information, and feature abort.

A/V devices that operate in accordance with the CEC control protocol are referred to herein as CEC enabled devices, and A/V devices that do not operate in accordance with the CEC control protocol are referred to herein as non-CEC enabled devices. Examples of such A/V device types which may be on a CEC bus connected to a television, in accordance with the CEC specification, include Player, Recorder and Tuner. These devices may communicate with the television via a set-top box (STB) or set-back box (SBB).

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Figure 1:
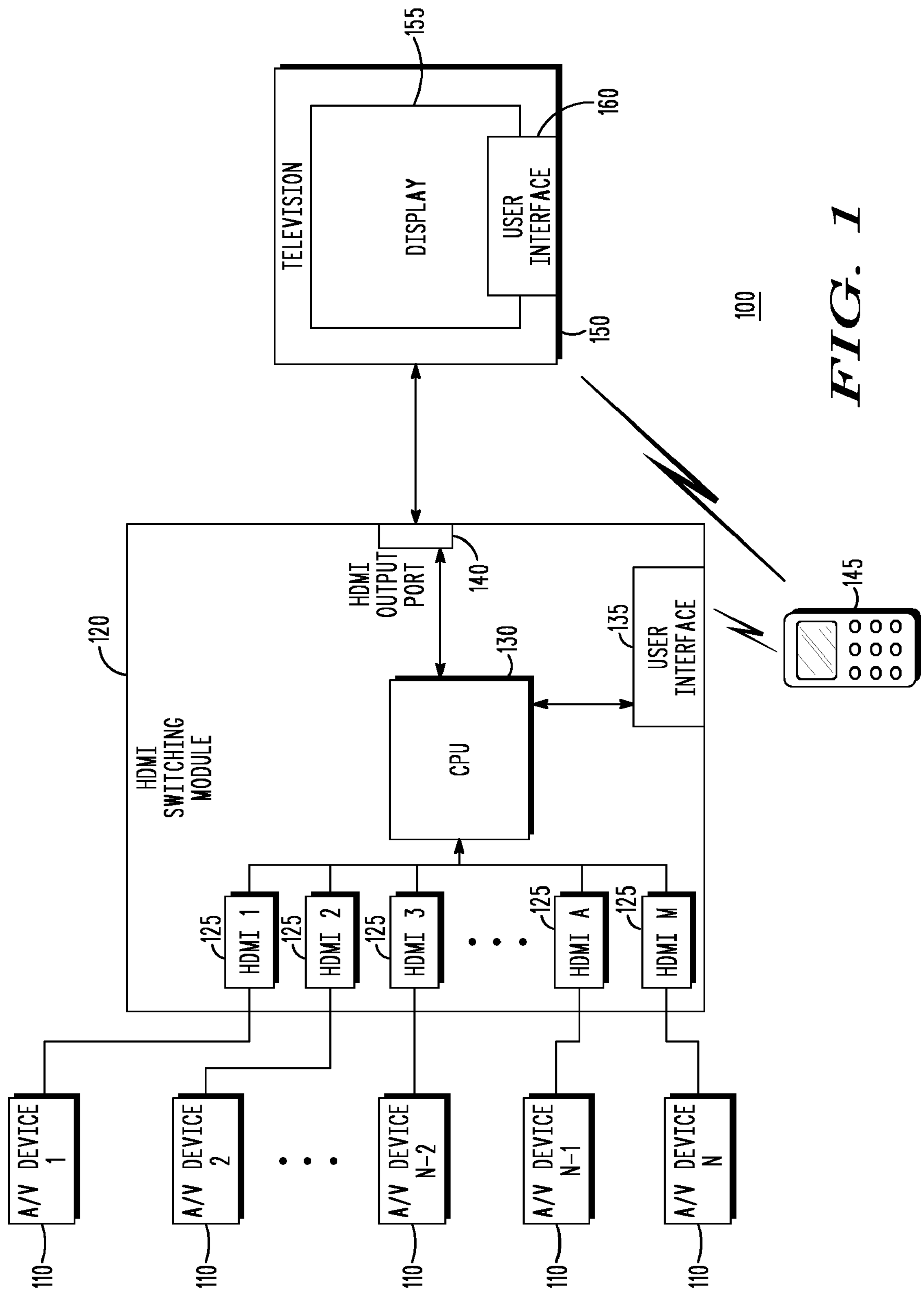
FIG. 1 is a system block diagram of a system that facilitates communication of multiple HDMI inputs to a television in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

An HDMI switching apparatus or module, herein referred to as an HDMI switching module, facilitates communication between not only CEC enabled devices and a television in an A/V system but also between non-CEC enabled devices and the television. The HDMI switching module allows multiple HDMI inputs to be provided to a television. The switching module may be used as part of a set-back-box (SBB) or a set-top box (STB), or it may be used as a standalone module.

In an audio/visual (A/V) system operable to facilitate communications between multiple high definition multimedia interface (HMDI) input devices and digital television of the audio/visual system, in addition to the HDMI switching module, there is the digital television, and one or more non-CEC enabled devices; there may also be one or more CEC enabled devices, as will be discussed. The HDMI switching module is operable to facilitate communications between the one or more non-CEC enabled devices and the digital television in accordance with user control of the HDMI switching module. In response to user control, an HDMI input port of the HDMI switching module is selected and a default HDMI device type and corresponding HDMI logic address is set for each non-CEC enabled device of the one or more non-CEC enabled devices and the HDMI switching module outputs the default HDMI device type of the non-CEC enabled device to the digital television which displays the non-CEC enabled device.

The switching module also accommodates the situation where one or more CEC enabled devices may be coupled to HDMI input ports of the switching module. When a CEC enabled device of the one or more CEC enabled devices is coupled to an HDMI input port of the HDMI switching module, the CEC enabled device polls a plurality of HMDI logical addresses of the HDMI switching module in priority order of first those logical addresses of the plurality of HDMI logical addresses that correspond to a CEC device type of the CEC enabled device and selects the first logical address of the plurality of HDMI logical addresses that is available. More specifically, the CEC enabled device polls the CEC bus in priority order of first those logical addresses of a plurality of HDMI logical addresses that correspond to a CEC device type of the CEC enabled device and selects the first logical address of the plurality of HDMI logical addresses that is available. The programmed processor controls the HDMI output port to output the first logic address and a logical device type of the first logic address selected by the CEC enabled device. As will be illustrated, when a CEC enabled device is connected to the CEC bus of the HDMI switching module, the module polls the logical address of the first device of the type corresponding to the type of the CEC enabled device. If it is not acknowledged, i.e. it is available and not taken by another device, then the CEC enabled devices knows that it is the first A/V device of that type on the bus and takes that logical address. If, however, it is not acknowledged, the switching module tries the second logical address of its device type and so on until it finds an open logical address that is available and takes that. If the CEC enabled device tries all of the logical addresses of its specific type and finds all are in use, it then takes an "unregistered" address. It is noted that several devices may share this address so that the TV can access the address but it may be broadcast to several devices.

Referring now to FIG. 1, it can be seen that a number of A/V devices 110, referenced as NV Device1, 2, . . . , N-2, N-1, N , which may be CEC or non-CEC enabled devices, may be coupled to HDMI switching module 120 as shown. HDMI switching module 120 has a number of HDMI input ports 125, referenced as HDMI1,2, 3, . . . , M-1, M, to which the A/V devices 110 may connect. It can be seen that the number of A/V Devices 110 need to match the number of HDMI input ports 125. The HDMI input ports 125 receive signals which are provided to processor or central processing unit (CPU) 130. CPU 130 is a programmed processor, operable to run code or software segments, that controls operation of the HDMI switching module and receives information about any of the one or more devices coupled to the plurality of HDMI input ports. CPU 130 controls user interface 135, which has a select and set element, such as that illustrated in FIG. 2, and a software segment running on the programmed processor 130.

As shown, the output signal(s) of HDMI output port 140 may be provided to television 150 under control of CPU 130. The software segment may be an Internet video player, such as Microsoft's Windows media player, a DVD player, an Internet browser, etc.

In the case of one or more non-CEC enabled devices coupled to one or more HDMI input ports 125, in response to user control via the user interface 135, an HDMI input port of the HDMI switching module is selected and a default HDMI device type and corresponding HDMI logic address is set for each non-CEC enabled device coupled to the HDMI input port. The HDMI switching module CPU 135 causes the default HDMI device type of the non-CEC enabled device to be output via the HDMI output port 140 to the television which displays the non-CEC enabled device. A remote commander 145 may be used by the user to interface with user interface 135.

In the case of CEC enabled devices coupled to one or more of the HDMI input ports 125, such as a CEC enabled device so coupled polls the HMDI logical addresses of the CEC bus to which the HDMI switching module 120 is coupled in priority order of first those logical addresses of the plurality of HDMI logical addresses that correspond to a CEC device type of the CEC enabled device and selects the first logical address of the plurality of HDMI logical addresses that is available. The CEC control signal associated with the CEC enabled device will pass through the HDMI switcher module to the TV, the TV acknowledging the CEC command line and then displaying the logical device on the TV Menu screen, for instance. The programmed processor 130 controls the HDMI output port 140 to output the first logic address and a logical device type of the first logic address selected by the CEC enabled device. It can then be provided to the television 150 for display on the screen display element 155.

Conversely, as will be described in connection with FIG. 5, the user interface may interface a user with the television via a remote control or commander; screenshots of user interface via the television is illustrated extensively in FIGS. 8-13 and 15-16. In these instances, the user interface 160 of the television is used.

Figure 2:
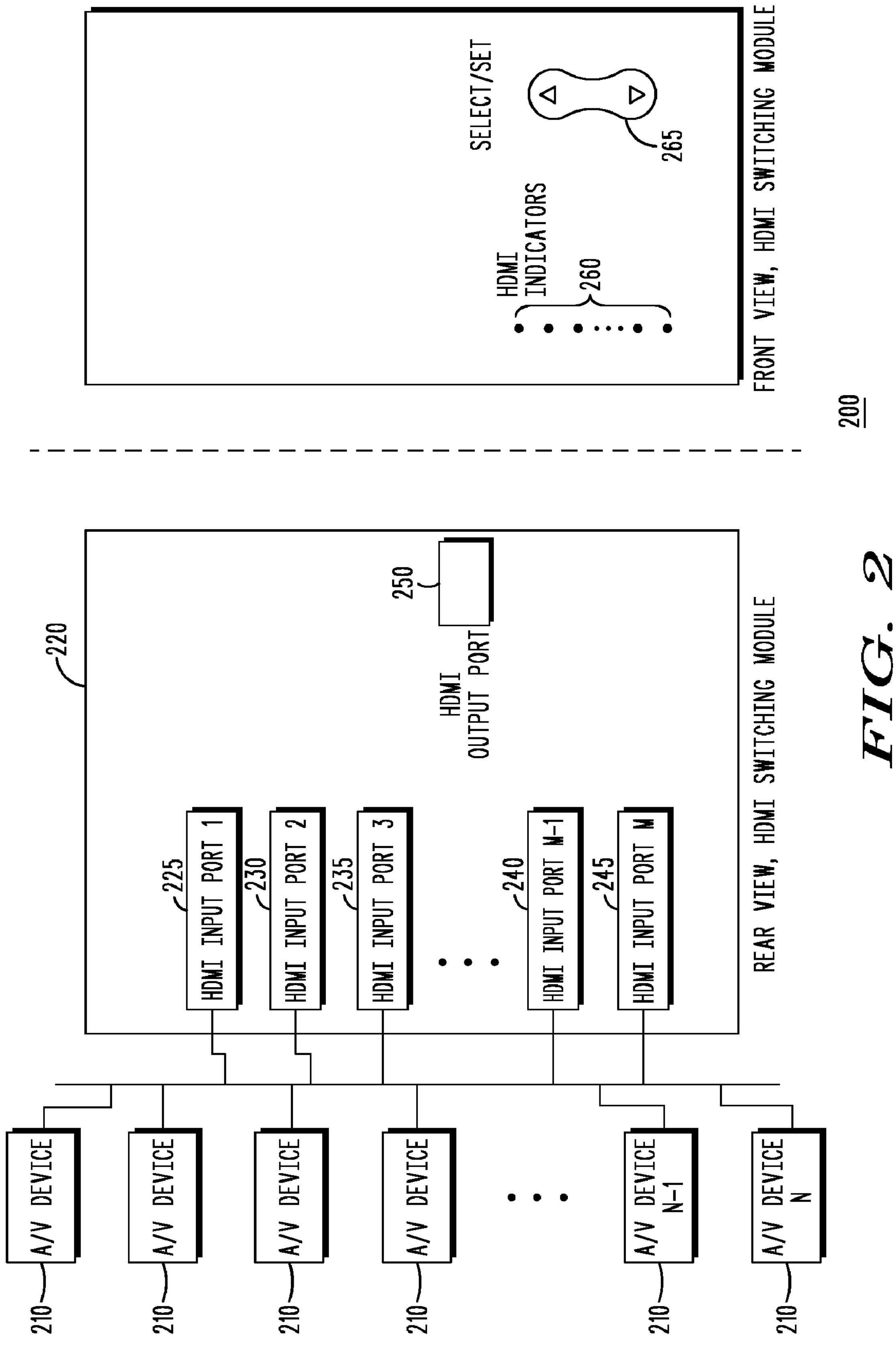
FIG. 2 is a block diagram of an HDMI switching module, in accordance with various embodiments.

In diagram 200 of FIG. 2 the front and rear views of an exemplary HDMI switching module 220 is shown. The A/V devices 210 may be coupled to a number of different HDMI Input Ports 225, 230, 235, 240, 245 and HDMI output signal (s) are output via HDMI output port 250, illustrated in the rear view of the switching module. Again, as discussed, the A/V devices 210 may be CEC as well as non-CEC devices as will be described. The front view of HDMI switching module illustrates an exemplary embodiment of the user interface for use by a user: HDMI indicators 260 and select/set button 265, shown in this example as a toggle button. For non-CEC enabled devices, HDMI indicators 260 and select/set button can together by used as part of the user interface to allow the user to first select which HDMI input port to set, using the HDMI indicators, and then to set the device type of the A/V device coupled to the selected HDMI port, using the select/set button. The HDMI output port 250 is controlled by the programmed processor to output the set default HDMI device type of the non-CEC enabled device coupled to that particular HDMI input port. This information may be provided to a television as shown in FIG. 1.

As previously described, the select and set element of the user interface of the HDMI switching module, in response to user manipulation selects an HDMI input port of the HDMI input ports to which a non-CEC enabled device of the is coupled and sets a default HDMI device type having a corresponding HDMI logic address that is mapped to the non-CEC enabled device. Consider the example of where an HDMI cable is connected from the output of a non-CEC enabled device to HDMI1 input port 225 in the back of the HDMI switcher. The "Select/Set" button 265 is used to toggle up/down until the indicator, such as an LED indicator, associated with the HDMI1 input is lit. The select/set button 265 can then be used to set the HDMI1 input port to the device type, such as recorder, player, tuner, etc., associated with HDMI1 input port. For example, the select/set button may be held for an adequate period of time, such as 3-5 seconds, to perform this set function. This process may be repeated by the user for the rest of the A/V devices coupled to the HDMI input ports.

In the case of CEC enabled devices coupled to the HDMI input ports, the user interface of the switching module is used less, as a particular CEC enabled device will manage the connection itself. Consider the case where a HDMI cable is used to connect the output of a CEC enabled device to another HDMI input port, such as HDMI2 input port 230, at the back of the HDMI switching module 220. The CEC enabled device polls a plurality of HMDI logical addresses of the CEC bus to which the HDMI switching module is coupled in priority order of first those logical addresses of the plurality of HDMI logical addresses that correspond to a CEC device type of the CEC enabled device and then selects for the CEC enabled device the first logical address of the plurality of HDMI logical addresses that is available. The programmed processor controls the HDMI output port to output the first logic address and a logical device type of the first logic address selected by the CEC enabled device. When no logical addresses of the plurality of HDMI logical addresses correspond to a device type of the CEC enabled device, the first logical address is an unregistered HDMI logical address of the HDMI switching module.

With regard to the CEC protocol specification, there are a number of Logical Addresses. The HDMI specification for CEC allows only 12 identified devices are on any CEC Bus. The specification of the CEC protocol only allows certain types of A/V devices to be defined on any CEC Bus connected to a TV; these are:

| LOGICAL ADDRESS | DEVICE |
|---|---|
| 0 | TV |
| 1 | RECORDING DEVICE 1 |
| 2 | RECORDING DEVICE 2 |
| 3 | TUNER 1 |
| 4 | PLAYBACK DEVICE 1 |
| 5 | AUDIO SYSTEM |
| 6 | TUNER 2 |
| 7 | TUNER 3 |
| 8 | PLAYBACK DEVICE 2 |
| 9 | RECORDING DEVICE 3 |
| 10 | TUNER 4 |
| 11 | PLAYBACK DEVICE 3 |
| 12 | RESERVED |
| 13 | RESERVED |
| 14 | FREE USE |
| 15 | UNREGISTERED (AS INITIATOR ADDRESS)<br>BROADCAST (AS DESTINATION ADDRESS) |

It can be seen that only three players, three recorders, four tuners, one free use address (used by 2008 televisions), one audio system, a reserved logical address (of which two are not allowed by HDMI), and unregistered logical addresses (for which many A/V devices may use).

Figure 3:
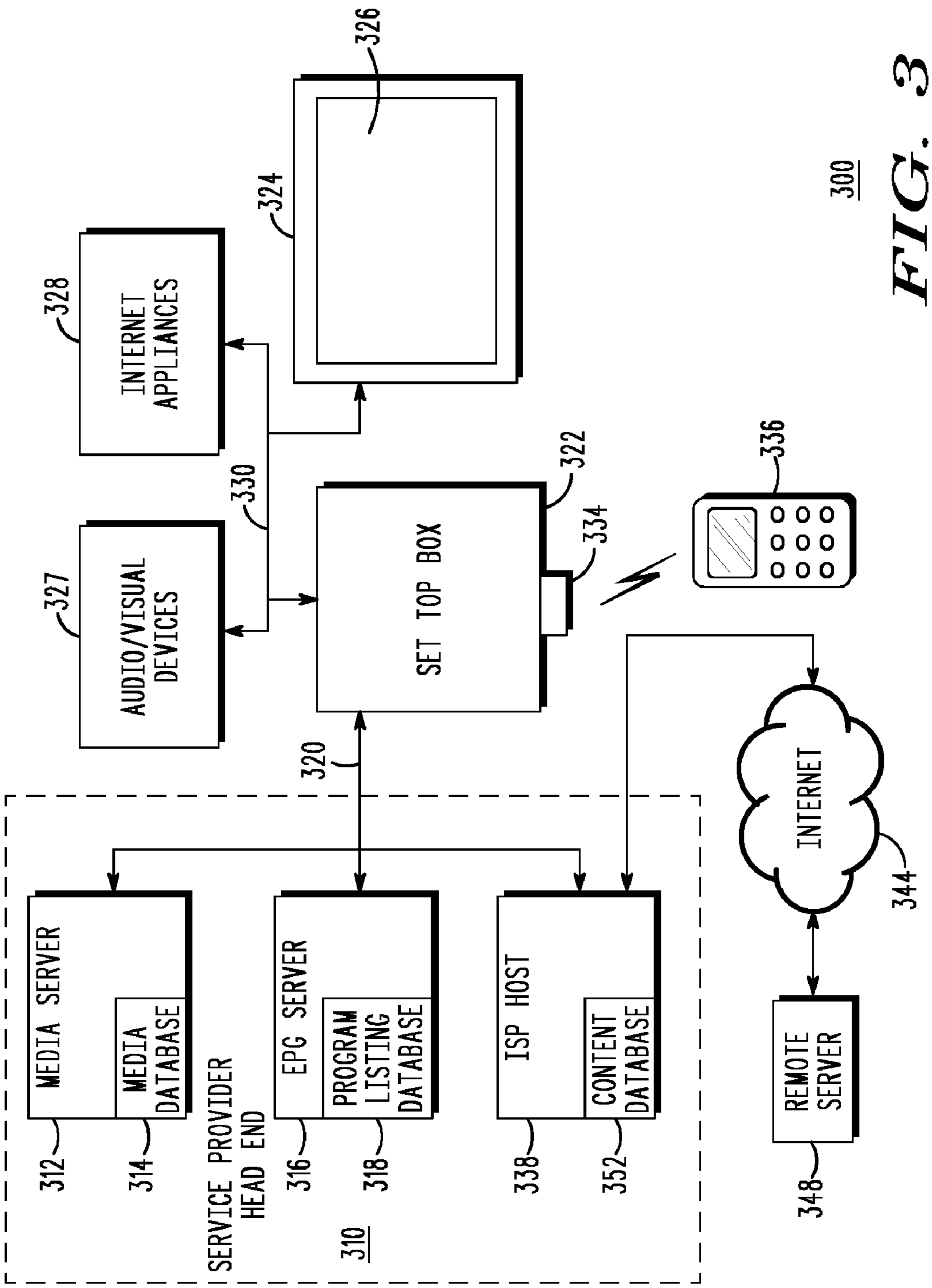
FIG. 3 is a system block diagram of a system using a set-top box, in accordance with various embodiments.

It has been mentioned the HDMI switching module described herein may be part of a SBB or STB coupled to a television, or it may be a stand-alone device. Referring now to FIG. 3, an example of an exemplary interactive cable or satellite television (TV) system 300 that uses a STB is shown.

The system 300 includes, at a head end of the service provider 310, a media server 312 for providing, on demand, movies and other programming obtained from a media database 314. The media server 312 might also provide additional content such as interviews with the actors, games, advertisements, available merchandise, associated Web pages, interactive games and other related content. The system 300 also includes an electronic programming guide (EPG) server 316 and a program listing database 318 for generating an EPG. Set-top box 322 can generally provide for bidirectional communication over a transmission medium 320 in the case of a cable STB 322. In other embodiments, bidirectional communication can be effected using asymmetrical communication techniques possibly using dual communication media—one for the uplink and one for the downlink. In any event, the STB 322 can have its own Universal Resource Locator (URL) or IP address or other unique identifier assigned thereto to provide for addressability by the head end and users of the Internet.

The media server 312 and EPG server 316 are operatively coupled by transmission medium 320 to a set-top box (STB) 322. The transmission medium 320 may include, for example, a conventional coaxial cable network, a fiber optic cable network, telephone system, twisted pair, a satellite communication system, a radio frequency (RF) system, a microwave system, other wireless systems, a combination of wired and wireless systems or any of a variety of known electronic transmission mediums. In the case of a cable television network, transmission medium 320 is commonly realized at the subscriber's premises as a coaxial cable that is connected to a suitable cable connector at the rear panel of the STB 322. In the case of a Direct Satellite System (DSS), the STB 322 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 322.

The exemplary system 300 further includes a TV 324, such as a digital television, having a display 326 for displaying programming, an EPG, etc. The STB 322 may be coupled to the TV 324 and various other audio/visual devices 327 (such as audio systems, Personal Video Recorders (PVRs), Video Tape Recorders (VTRs), Video Cassette Recorders (VCRs) and the like), storage devices (e.g., hard disc drives) and Internet Appliances 328 (such as email devices, home appliances, storage devices, network devices, and other Internet Enabled Appliances) by an appropriate interface 330, which can be any suitable analog or digital interface. In one embodiment, interface 330 conforms to an interface standard such as the Institute of Electrical and Electronics Engineers (IEEE) 1394 standard, but could also be wholly or partially supported by a DVI interface (Digital Visual Interface-Digital Display Working Group, www.ddwg.org), HDMI or other suitable interface.

The STB 322 may include a central processing unit (CPU) such as a microprocessor and memory such as Random Access Memory (RAM), Read Only Memory (ROM), flash memory, mass storage such as a hard disc drive, floppy disc drive, optical disc drive or may accommodate other electronic storage media, etc. Such memory and storage media is suitable for storing data as well as instructions for programmed processes for execution on the CPU, as will be discussed later. Information and programs stored on the electronic storage media or memory may also be transported over any suitable transmission medium such as that illustrated as 320. STB 322 may include circuitry suitable for audio decoding and processing, the decoding of video data compressed in accordance with a compression standard such as the Motion Pictures Experts Group (MPEG) standard and other processing to form a controller or central hub. Alternatively, components of the STB 322 may be incorporated into the TV 324 itself, thus eliminating the STB 322. Further, a computer having a tuner device and modem may be equivalently substituted for the TV 324 and STB 322.

By way of example, the STB 322 may be coupled to devices such as a personal computer, video cassette recorder, camcorder, digital camera, personal digital assistant and other audio/visual or Internet related devices. In addition, a data transport architecture, such as that set forth by an industry group which includes Sony Corporation and known as the Home Audio-Video Interoperability (HAVi) architecture may be utilized to enable interoperability among devices on a network regardless of the manufacturer of the device. This forms a home network system wherein electronic devices and Internet appliances are compatible with each other. The STB 322 runs an operating system suitable for a home network system such as Sony Corporation's Aperios™ real time operating system. Other operating systems could also be used.

The STB 322 includes an infrared (IR) receiver 334 for receiving IR signals from an input device such as remote control or commander 336. Alternatively, it is noted that many other control communication methods may be utilized besides IR, such as wired or wireless radio frequency, etc. In addition, it can be readily appreciated that the input device 336 may be any device suitable for controlling the STB 322 such as a remote control or commander, personal digital assistant, laptop computer, keyboard or computer mouse. In addition, an input device in the form of a control panel located on the TV 324 or the STB 322 can be provided.

The STB 322 may also be coupled to an independent service provider (ISP) host 338 by a suitable connection including dial-up connections, DSL (Digital Subscriber Line) or the same transmission medium 320 described above (e.g., using a cable modem) to, thus, provide access to services and content from the ISP and the Internet. The ISP host 338 provides various content to the user that is obtained from a content database 352. STB 322 may also be used as an Internet access device to obtain information and content from remote servers such as remote server 348 via the Internet 344 using host 338 operating as an Internet portal, for example. In certain satellite STB environments, the data can be downloaded at very high speed from a satellite link, with asymmetrical upload speed from the set-top box provided via a dial-up or DSL connection.

While the arrangement illustrated in FIG. 3 shows a plurality of servers and databases depicted as independent devices, any one or more of the servers can operate as server software residing on a single computer. Moreover, although not explicitly illustrated, the servers may operate in a coordinated manner under centralized or distributed control to provide multiple services as a Multiple Service Operator (MSO) in a known manner. Additionally, the services provided by the servers shown in FIG. 3 may actually reside in other locations, but from the perspective of the user of STB 322, the service provider 310 serves as a portal to the services shown. Those skilled in the art will appreciate that the illustration of FIG. 3 represents a simplified depiction of a cable system configuration shown simply as service provider 310. The actual configuration of the service provider's equipment is more likely to follow a configuration defined by the Cable- Labs OpenCable™ specification. The simplified illustration shown is intended to simplify the discussion of the service provider 310's operation without unnecessarily burdening the discussion with architectural details that will be evident to those skilled in the art. Those details can be found in the publicly available CableLabs OpenCable™ specification or in the text "OpenCable Architecture (Fundamentals)" by Michael Adams, Cisco Press, November 1999.

Figure 4:
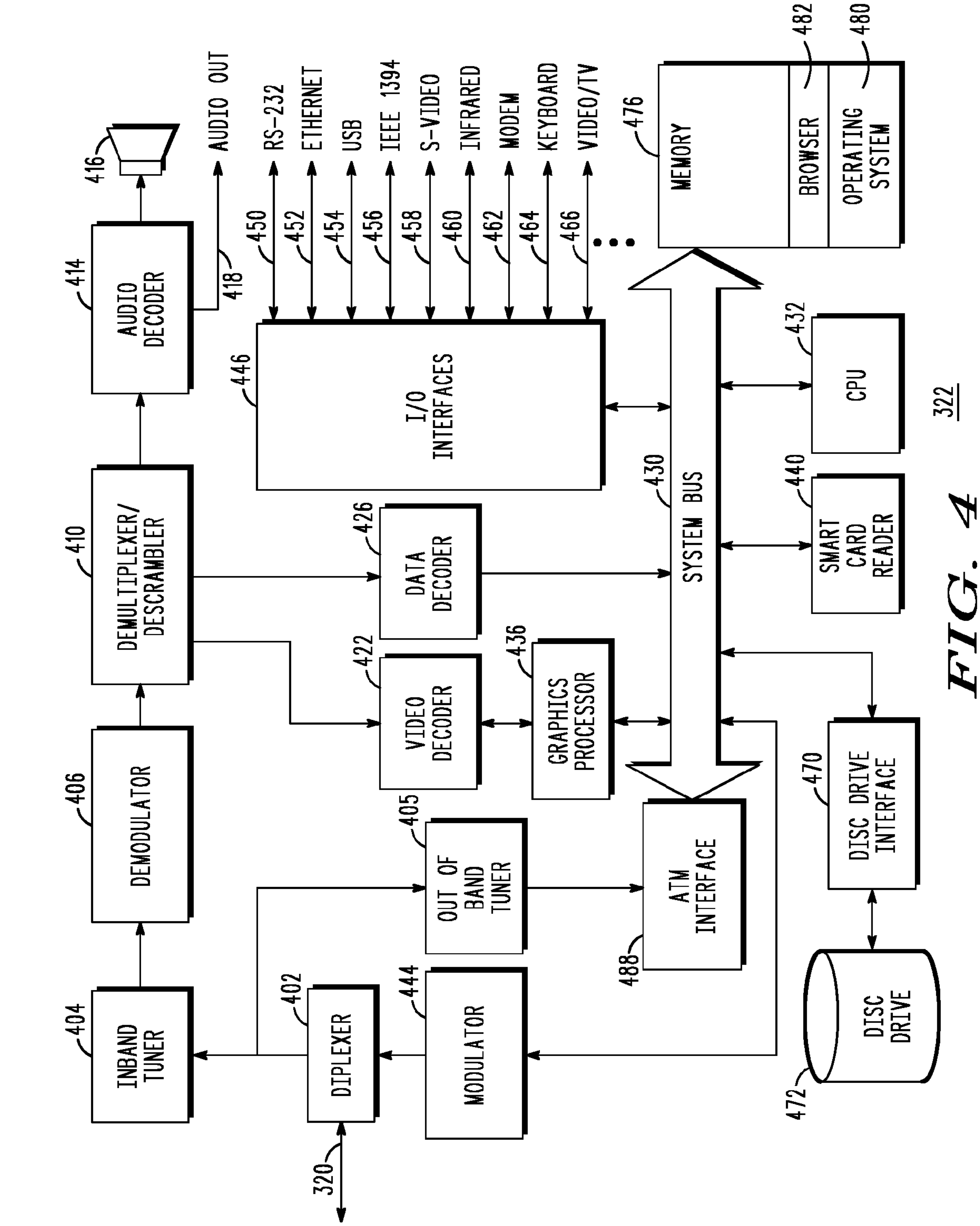
FIG. 4 is a functional block diagram of a digital set-top box, in accordance with various embodiments.

Referring now to FIG. 4, a typical system configuration for a digital set-top box 322 is illustrated. In this exemplary set-top box, the transmission medium 320, such as a coaxial cable, is coupled by a suitable interface through a diplexer 402 to an in-band tuner 404. Tuner 404 may, for example, include a broadcast in-band tuner for receiving video content. An out-of-band (OOB) tuner 405 is provided for receiving data transmissions, including ATM formatted SI data, and providing information to ATM Interface 488. A return path through diplexer 402 provides an OOB return path for outbound data (destined for example for the head end). A separate tuner (not shown) may be provided to receive conventional RF broadcast television channels. Modulated information formatted, for example, as MPEG-2 information is then demodulated at a demodulator 406. The demodulated information at the output of demodulator 406 is provided to a demultiplexer and descrambler circuit 410 where the information is separated into discrete channels of programming. The programming is divided into packets, each packet bearing an identifier called a Packet ID (PID) that identifies the packet as containing a particular type of data (e.g., audio, video, data). The demodulator and descrambler circuit 410 also decrypts encrypted information in accordance with a decryption algorithm to prevent unauthorized access to programming content, for example.

Audio packets from the demultiplexer 410 (those identified with an audio PID) are decrypted and forwarded to an audio decoder 414 where they may be converted to analog audio to drive a speaker system (e.g., stereo or home theater multiple channel audio systems) or other audio system 416 (e.g., stereo or home theater multiple channel amplifier and speaker systems) or may simply provide decoded audio out at 418. Video packets from the demultiplexer 410 (those identified with a video PID) are decrypted and forwarded to a video decoder 422. In a similar manner, data packets from the demultiplexer 410 (those identified with a data PID) are decrypted and forwarded to a data decoder 426.

Decoded data packets from data decoder 426 are sent to the set-top box's computer system via the system bus 430. A central processing unit (CPU) 432 can thus access the decoded data from data decoder 426 via the system bus 430. Video data decoded by video decoder 422 is passed to a graphics processor 436, which is a computer optimized to processes graphics information rapidly. Graphics processor 436 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 436 may be unnecessary in some set-top box designs having lower capabilities, and the function of the graphics processor 436 may be handled by the CPU 432 in some applications where the decoded video is passed directly from the demultiplexer 410 to a video encoder. Graphics processor 436 is also coupled to the system bus 430 and operates under the control of CPU 432.

Many set-top boxes such as STB 322 may incorporate a smart card reader 440 for communicating with a so called "smart card," often serving as a Conditional Access Module (CAM). The CAM typically includes a central processor unit (CPU) of its own along with associated RAM and ROM memory. Smart card reader 440 is used to couple the system bus of STB 322 to the smart card serving as a CAM (not shown). Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 322 can operate in a bidirectional communication mode so that data and other information can be transmitted not only from the system's head end to the end user, or from a service provider to the end user of the STB 322, but also, from the end user upstream using an out-of-band channel. In one embodiment, such data passes through the system bus 430 to a modulator 444 through the diplexer 402 and out through the transmission medium 320. This capability is used to provide a mechanism for the STB 322 and/or its user to send information to the head end (e.g., service requests or changes, registration information, etc.) as well as to provide fast outbound communication with the Internet or other services provided at the head end to the end user.

Set-top box 322 may include any of a plurality of I/O (Input/Output) interfaces represented by I/O interfaces 446 that permit interconnection of I/O devices to the set-top box 322. By way of example, and not limitation, a serial RS-232 port 450 can be provided to enable interconnection to any suitable serial device supported by the STB 322's internal software. Similarly, communication with appropriately compatible devices can be provided via an Ethernet port 452 (wired or wireless), a USB (Universal Serial Bus) port 454, an IEEE 1394 (so-called firewire™ or i-link™) or IEEE 1394 wide port 456, S-video port 458 or infrared port 460, or Bluetooth. Such interfaces can be utilized to interconnect the STB 322 with any of a variety of accessory devices such as storage devices, audio/visual devices 327, gaming devices (not shown), Internet Appliances 328, etc.

I/O interfaces 446 can include a modem (be it dial-up, cable, DSL or other technology modem) having a modem port 462 to facilitate high speed or alternative access to the Internet or other data communication functions. In one preferred embodiment, modem port 462 is that of a DOCSIS (Data Over Cable System Interface Specification) cable modem to facilitate high speed network access over a cable system, and port 462 is appropriately coupled to the transmission medium 320 embodied as a coaxial cable. Thus, the STB 322 can carry out bidirectional communication via the DOCSIS cable modem with the STB 322 being identified by a unique IP address. The DOCSIS specification is publicly available.

A PS/2 or other keyboard/mouse/joystick interface such as 464 can be provided to permit ease of data entry to the STB 322. Such inputs provide the user with the ability to easily enter data and/or navigate using pointing devices. Pointing devices such as a mouse or joystick may be used in gaming applications.

Of course, STB 322 also may incorporate basic video outputs 466 that can be used for direct connection to a television set such as 324 instead of (or in addition to) an IEEE 1394 connection such as that illustrated as 430. In one embodiment, Video output 466 can provide composite video formatted as NTSC (National Television System Committee) video. In some embodiments, the video output 466 can be provided by a direct connection to the graphics processor 436 or the demultiplexer/descrambler 410 rather than passing through the system bus 430 as illustrated in the exemplary block diagram. S-Video signals from output 458 can be similarly provided without passing through the system bus 430 if desired in other embodiments.

The infrared port 460 can be embodied as an infrared receiver 334 as illustrated in FIG. 3, to receive commands from an infrared remote control 336, infrared keyboard or other infrared control device. Although not explicitly shown, front panel controls may be used in some embodiments to directly control the operation of the STB 322 through a front panel control interface as one of interfaces 446. Selected interfaces such as those described above and others can be provided in STB 322 in various combinations as required or desired.

STB 322 will more commonly, as time goes on, include a disc drive interface 470 and disc drive mass storage 472 for user storage of content and data as well as providing storage of programs operating on CPU 432. STB 322 may also include floppy disc drives, CD ROM drives, CD R/W drives, DVD drives, etc. CPU 432, in order to operate as a computer, is coupled through the system bus 430 (or through a multiple bus architecture) to memory 476. Memory 476 may include a combination any suitable memory technology including Random Access Memory (RAM), Read Only Memory (ROM), Flash memory, Electrically Erasable Programmable Read Only Memory (EEPROM), etc.

While the above exemplary system including STB 322 is illustrative of the basic components of a digital set-top box suitable for use with the present invention, the architecture shown should not be considered limiting since many variations of the hardware configuration are possible without departing from the present invention. The present invention could, for example, also be implemented in more advanced architectures such as that disclosed in U.S. patent application Ser. No. 09/473,625, filed Dec. 29, 1999, entitled "Internet Set-Top Box Having and In-Band Tuner and Cable Modem" and issued as U.S. Pat. No. 6,757,909 on Jun. 29, 2004 to Jun Maruo and Atsushi Kagami. This patent describes a set-top box using a multiple bus architecture with a high level of encryption between components for added security. This application is hereby incorporated by reference as though disclosed fully herein.

In general, during operation of the STB 322, an appropriate operating system 480 such as, for example, Sony Corporation's Aperios™ real time operating system is loaded into, or is permanently stored in, active memory along with the appropriate drivers for communication with the various interfaces. In other embodiments, other operating systems such as Microsoft Corporation's Windows CE™ could be used without departing from the present invention. Along with the operating system and associated drivers, the STB 322 usually operates using browser software 482 in active memory or may permanently reside in ROM, EEPROM or Flash memory, for example. The browser software 482 typically operates as the mechanism for viewing not only web pages on the Internet, but also serves as the mechanism for viewing an Electronic Program Guide (EPG) formatted as an HTML document. The browser 482 can also provide the mechanism for viewing normal programming (wherein normal programming is viewed as an HTML video window—often occupying the entire area of screen 326).

STB software architectures vary depending upon the operating system. However, in general, all such architectures generally include, at the lowest layer, various hardware interface layers. Next is an operating system layer as previously described. The software architectures of modern STB have generally evolved to include a next layer referred to as "middleware." Such middleware permits applications to run on multiple platforms with little regard for the actual operating system in place. Middleware standards are still evolving at this writing, but are commonly based upon Javascript and HTML (hypertext Markup Language) virtual machines. At the top layer is the application layer where user applications and the like reside (e.g., browsing, email, EPG, Video On Demand (VOD), rich multimedia applications, pay per view, etc.). The current invention can be utilized with any suitable set-top box software and hardware architecture.

Figure 5:
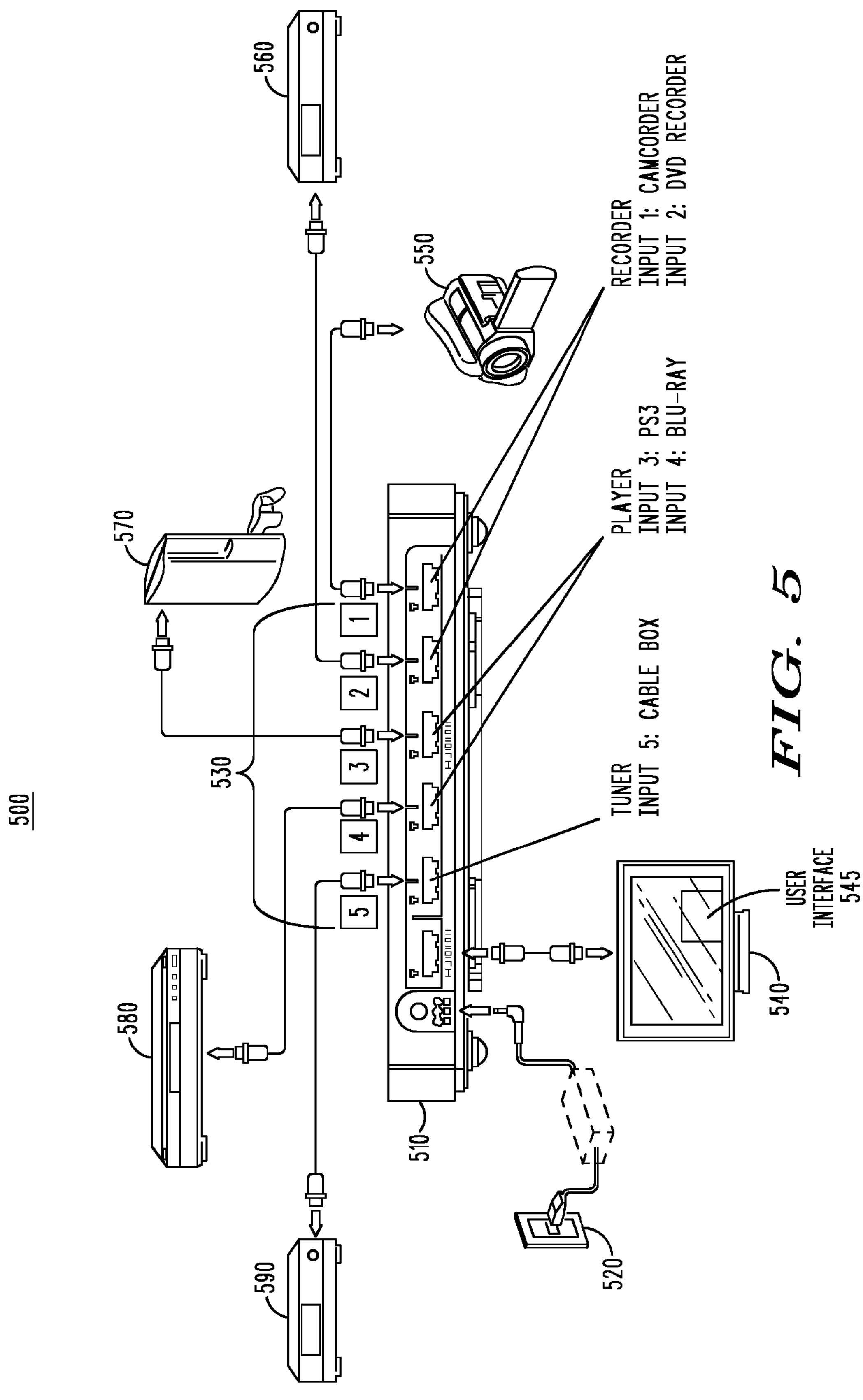
FIG. 5 is a system block diagram that illustrates an exemplary connection scheme, in accordance with various embodiments.

Referring now to FIG. 5, a system diagram 500 illustrating an exemplary connection example for connecting a number of devices to an HDMI switching module, which can then in turn be connected to a television 540 with user interface 545, is shown. In this particular example, HDMI switching module or link 510 has five HDMI input ports 530, labeled as input ports 1, 2, 3, 4 and 5, respectively, by which a device, CEC or non-CEC enabled, may be connected to HDMI switching module 510. HDMI switching module 510 may be provided power by an AC power source 520 as shown.

There are illustrated Recorder, Player, and Tuner HDMI CEC-enabled device types, corresponding to Inputs 1, 2, 3, 4, and 5 of the switching module. Recorder device type at Input 1 is a camcorder 550 and Recorder device type at Input 2 is a DVD recorder 560. Player device type at Input 3 is a PS3 570 while Player device type at Input 4 is a Blu-ray disc player device 580. Tuner device type at Input 5 is shown as a cable box, set-back box, set top box, or the like, 590. It is understood that the specific devices for each of the Recorder, Player and Tuner device types are provided by way of example and not limitation. Thus the exemplary system illustrated in FIG. 5 may employ other types of device types without departing from the spirit and scope of the invention.

Figure 6:
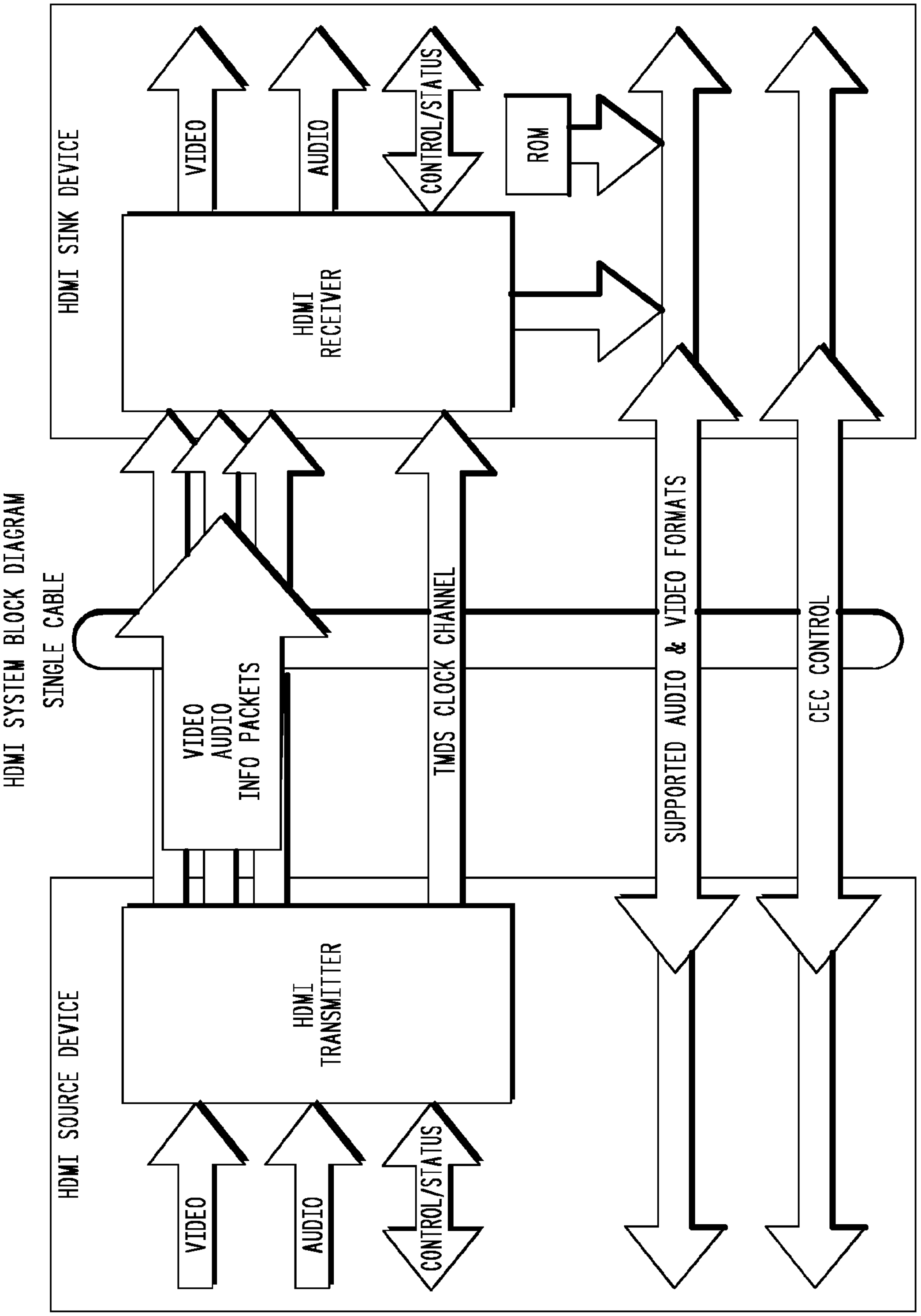
FIG. 6 is a HDMI system block diagram.

FIG. 6 references an exemplary HDMI System Block Diagram 600, said system transmitting CEC commands over a single cable. The HDMI-compatible device that is transmitting information may be referred to as a HDMI source device, while the HDMI-compatible device receiving the transmitted information is referred to as a HDMI sink device. It can be seen that audio, visual, control, status and CEC control information may be transmitted via one cable in the system. Of course, in a bi-directional system in which information is flowing both directions between various HDMI-compatible devices, such as between a TV and a module, like a STB or SBB, each device will have an HDMI transmitter and HDMI receiver and may be referred to as a source or sink device depending upon whether it is transmitting or receiving information.

HDMI 1.2a, released in December 2005 supports CEC features, command sets, and CEC compliance tests. Using a single cable, CEC control allows a user to control all HDMI devices with a remote control or commander user interface, including powering on or off connected devices, commands initiated by devices to other devices. It thus solves the problem of "too many remote controls." For instance, a user can press play on one HDMI device, such as a DVD, and operation of CEC commands causes the A/V receiver to automatically turn on and switch to the correct input, which in turn automatically turns on the TV, which automatically switches to the correct input received from the A/V receiver; such is an example of "one-touch play."

CEC features, as may be defined from time to time in the CEC Specification, Section 3.1, include one touch play, system audio control, etc. Other, optional features may include one touch recording, deck control, tuner control, On Screen Display (OSD) display, OSD name transfer, device menu control, RC pass-through, power status and vendor-specific commands (such as a vendor remote command). CEC control commands that may be particularly of interest in the communication between a STB (SBB) and TV may include the following: request active source, image view on, text view on, standby, give physical address, get menu language, polling message, report physical address, set menu language, device vendor ID, give device ID, user remote control pressed, user control released, set OSD string, give OSD name, set OSD name, give device power status, report power status, feature abort.

Figure 7:
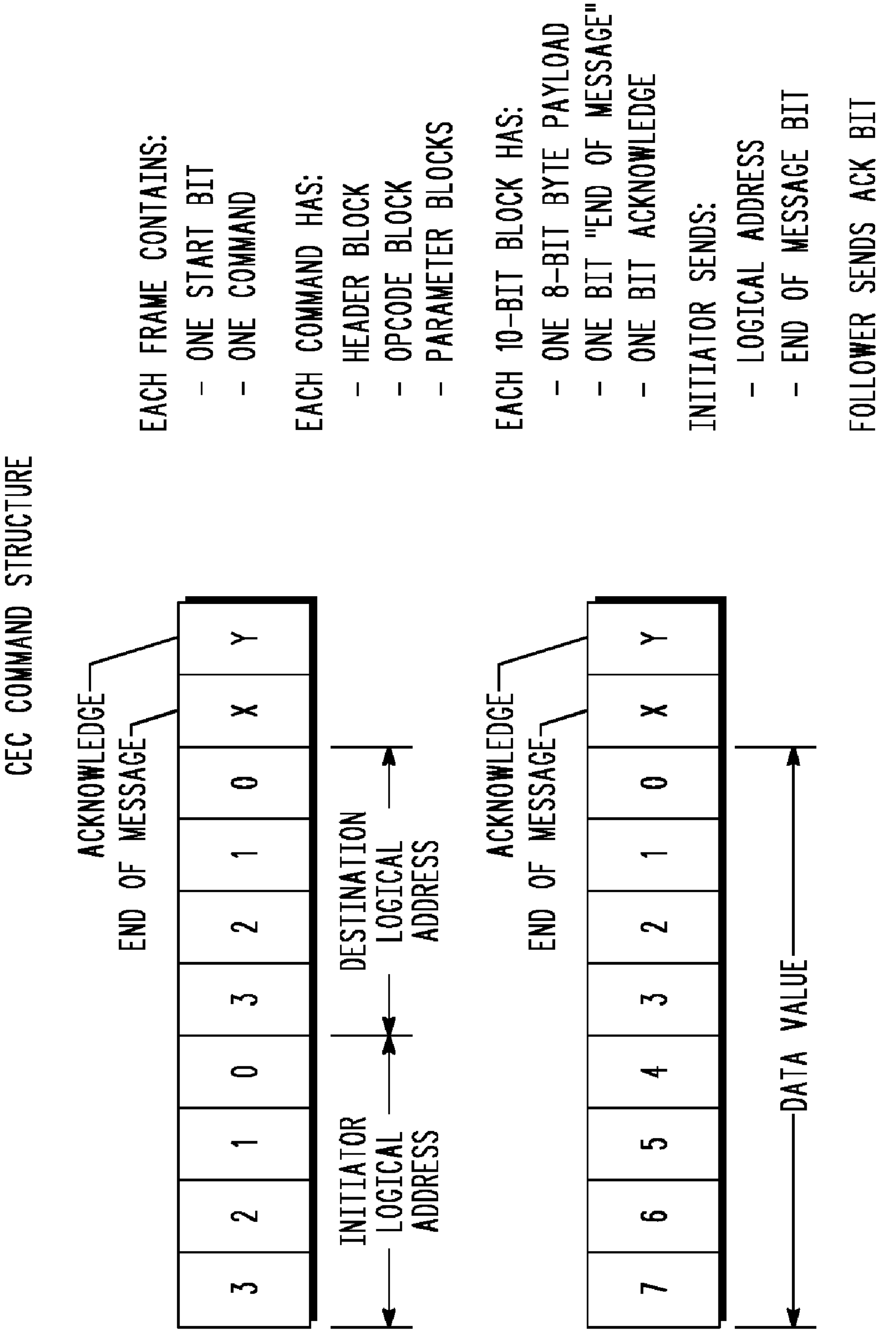
FIG. 7 illustrates a CEC command structure.

Of course, it is understood that the HDMI specification continues to mature, new CEC commands may be expected to be added from time to time as developed. A standard CEC command structure is illustrated in FIG. 7. This structure may remain the same to provide for back-ward compatibility.

Figure 8A:
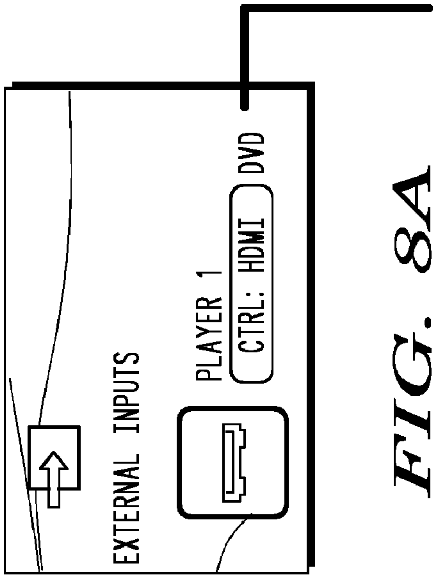
FIGS. 8A-8B and FIGS. 9A-9B illustrate examples of connecting both HDMI enabled and non-HDMI enabled A/V devices, in accordance with various embodiments.
Figure 8B:
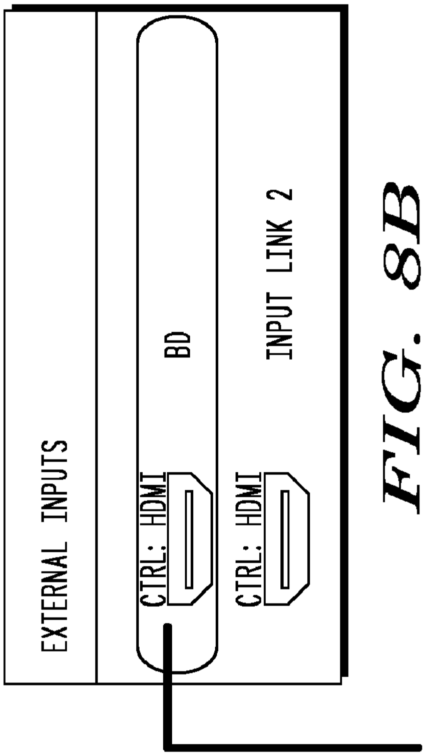
Figure 9A:
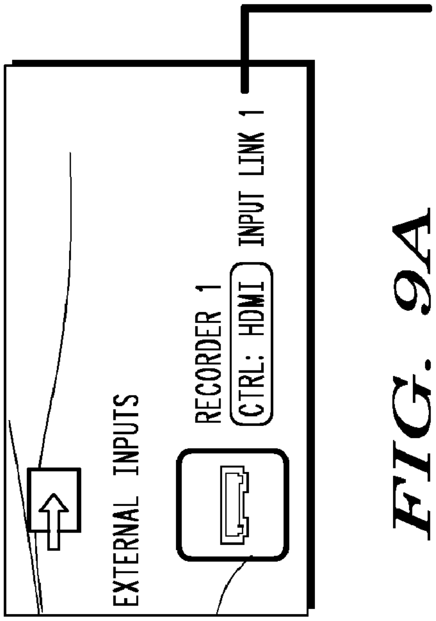
Figure 9B:
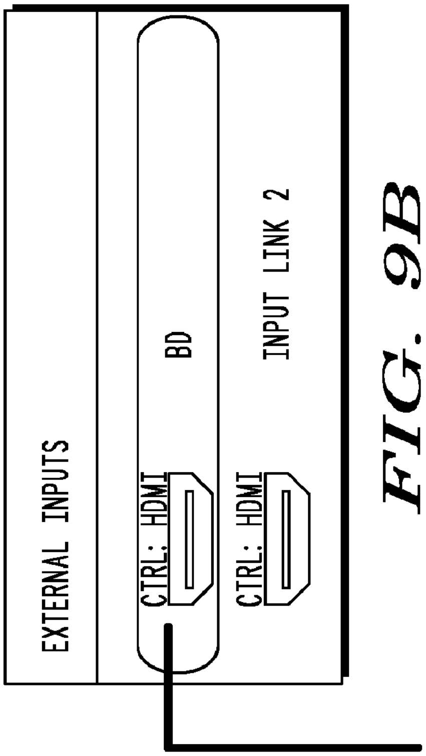

FIGS. 8A-8B and 9A-9B illustrate that the user interface provided by the television by which a user can interface with the HDMI switching module, is able to interface with A/V devices that provide control for HDMI and A/V devices that do not provide control for HDMI, such as standard equipment types. In FIG. 8A, a graphical user interface, such as Sony's XMediaBar, or XMB, that may be used for control of an A/V device that provides control for HDMI is illustrated. The external input for Player 1 is illustrated as a DVD device. In FIG. 8B, a television that provides a panel menu type user interface is illustrated, in which a Blu-ray device, BD, is illustrated as an external input. Contrast this with FIGS. 9A and 9B, in which the A/V device does not provide HDMI control, and the specific device is not shown to the user on the user interface of the television. In FIG. 9A, Recorder 1 input device is simply noted as Input Link1 in the XMB user interface, while in FIG. 9B the A/V input device is Input Link2 in the panel menu user interface. Please note that the control HDMI icon shown in user interface shots of FIGS. 8A-8B and 9A-9B are displayed when the device has been successfully connected to the HDMI switching module.

Figure 10:
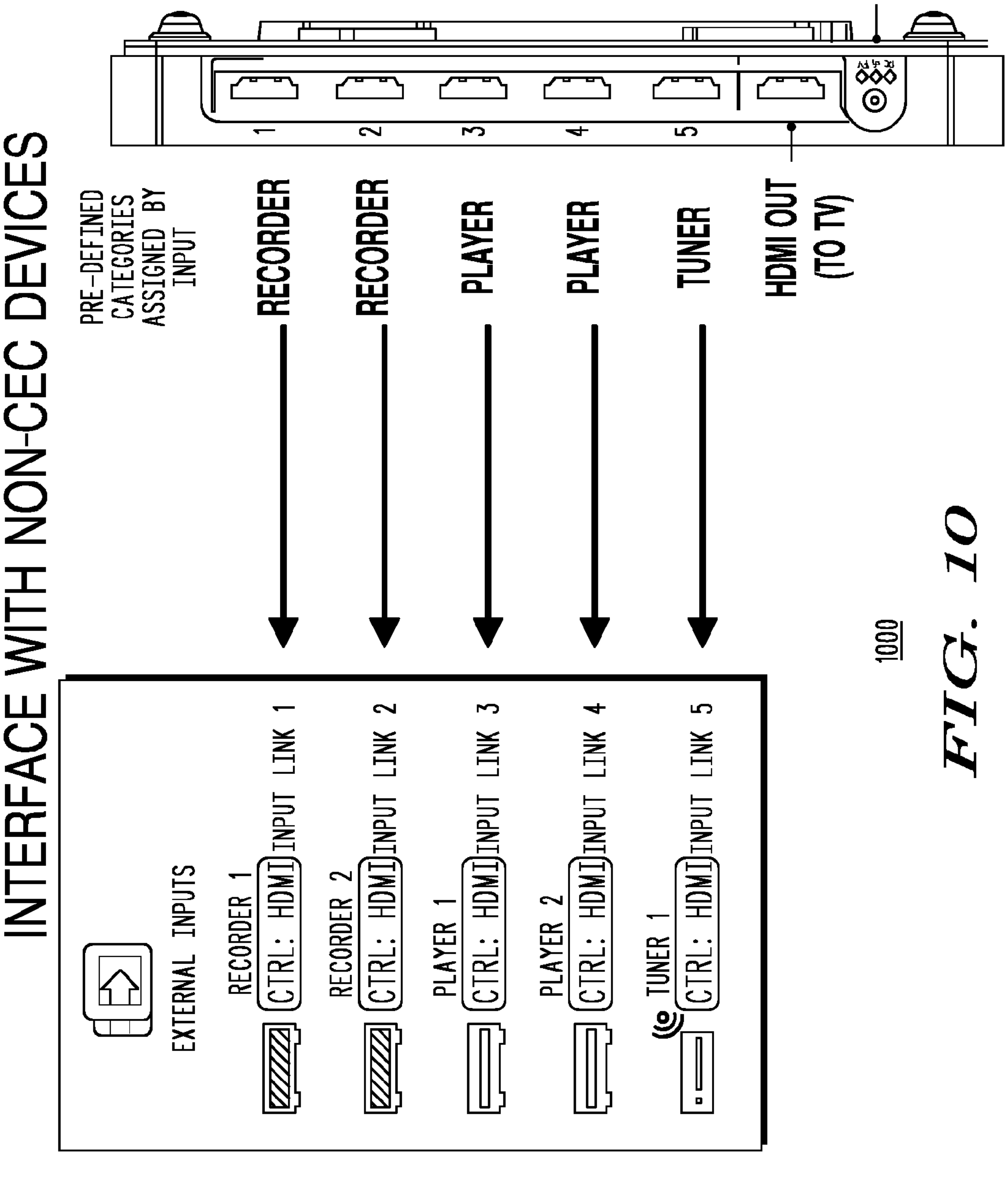
FIG. 10 is a block diagram illustrating an interface with non-CEC enabled devices, in accordance with various embodiments.

Consider the following examples of interfacing of non-CEC and/or CEC enabled A/V devices to a television via an HDMI switching module. Referring to FIG. 10, block diagram 1000 illustrates an interface with non-CEC enabled devices, in accordance with various embodiments. There are five non-CEC enabled devices in this example: Recorder 1, Recorder 2, Player 1, Player 2, and Tuner 1. These may be connected to the HDMI input ports 1-5, corresponding to Recorder 1, Recorder 2, Player 1, Player 2, and Tuner 1 as shown. These pre-defined categories or types of devices are assigned by the respective HDMI input ports. HDMI output port to the television is also shown.

Figure 11B:
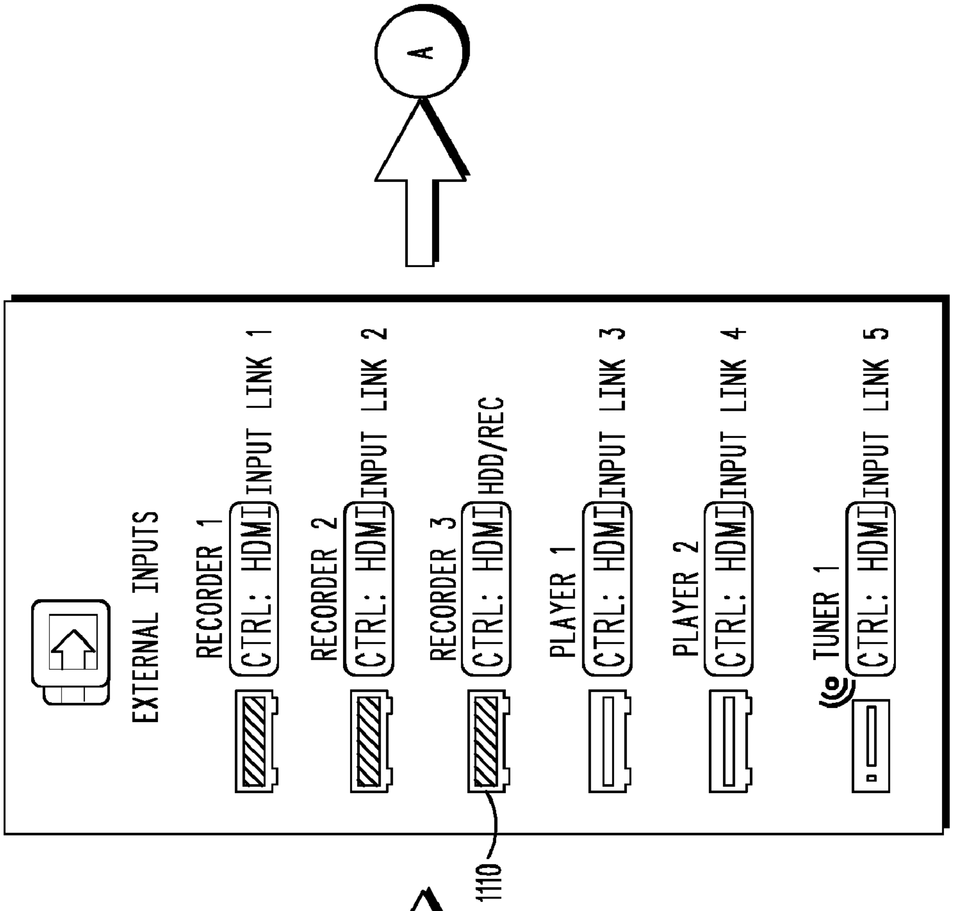
FIGS. 11A-11D illustrate an example of multiple non-CEC enabled devices coupled to an HDMI switcher, then multiple CEC enabled devices coupled to the HDMI switcher, in accordance with various embodiments.
Figure 11A:
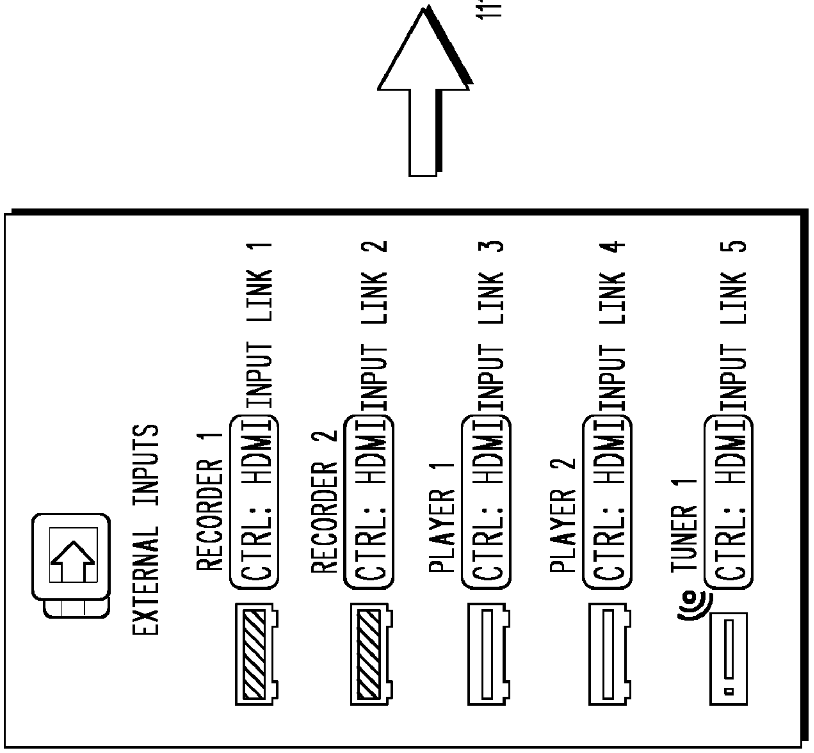
Figures 11C, 11D:
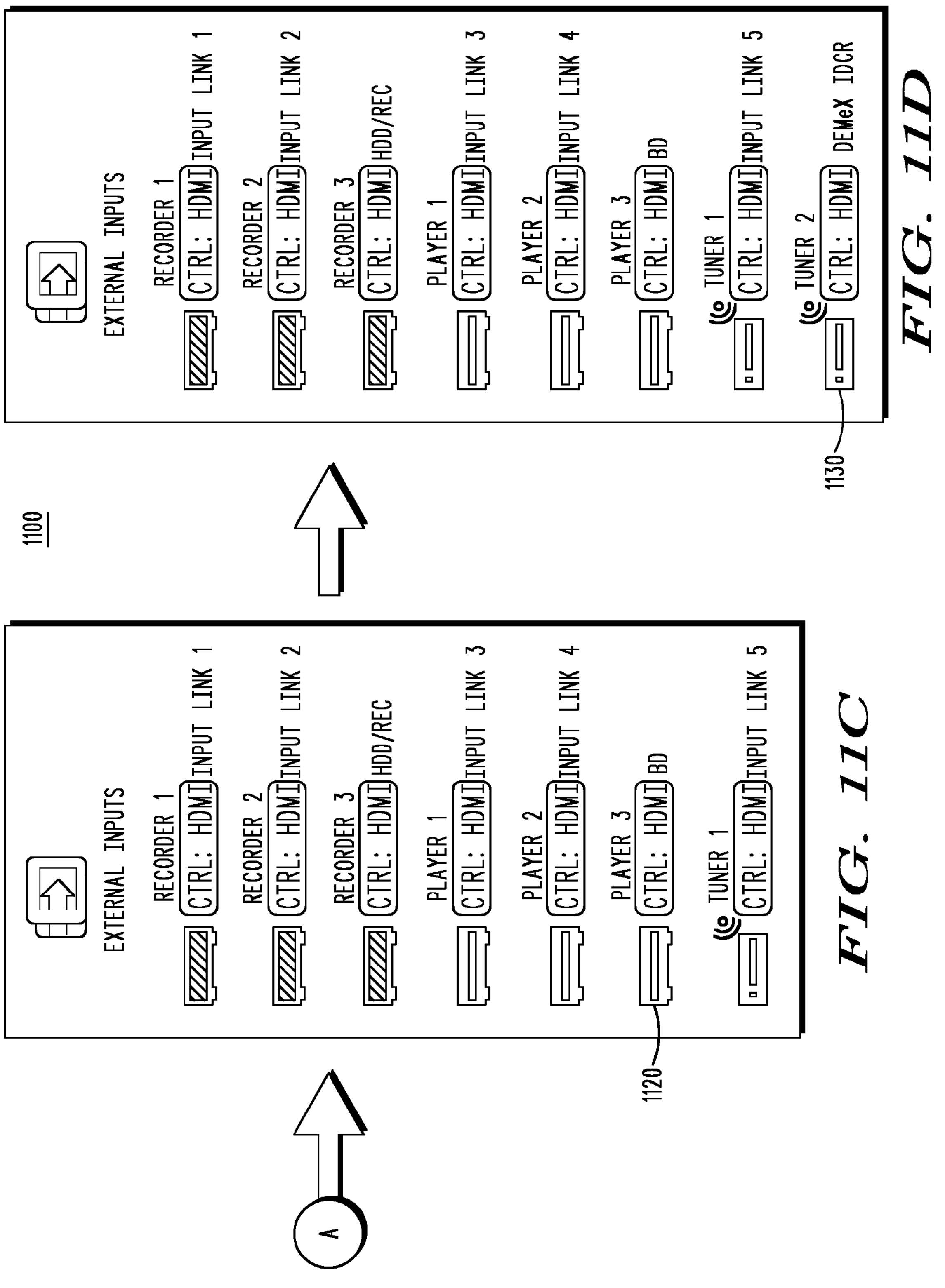

Now consider the case where these five non-CEC enabled devices of FIG. 10 as first connected to the HDMI switching module, followed by three CEC enabled devices subsequently coupled to various HDMI ports. This is illustrated in FIGS. 11A-11D, in accordance with various embodiments. The HDMI switching module in this example is coupled to HDMI1 input port of the television. FIG. 11A illustrates the first five non-CEC enabled devices coupled to five HDMI input ports. In FIG. 11B, the first additional recorder has been added, indicated by 1110; this may be a HDD recorder, for example. This is the third and last available "recorder" logical address permitted by the CEC specification. This additional recorder CEC enabled device is coupled to the HDMI2 port on the television. In FIG. 11C, a CEC "player" device is added to the HDMI input ports of the switcher at 1120; this also represents the last available "player" logical address permitted by the CEC specification. This additional "player" CEC device is coupled to HDMI3 input port on the television. In FIG. 11D, a user wishes to add an additional tuner, such as indicated by DMeX IDCR 1130. This additional tuner CEC enabled device is coupled to HDMI4 input port on the television.

Figures 12A, 12B:
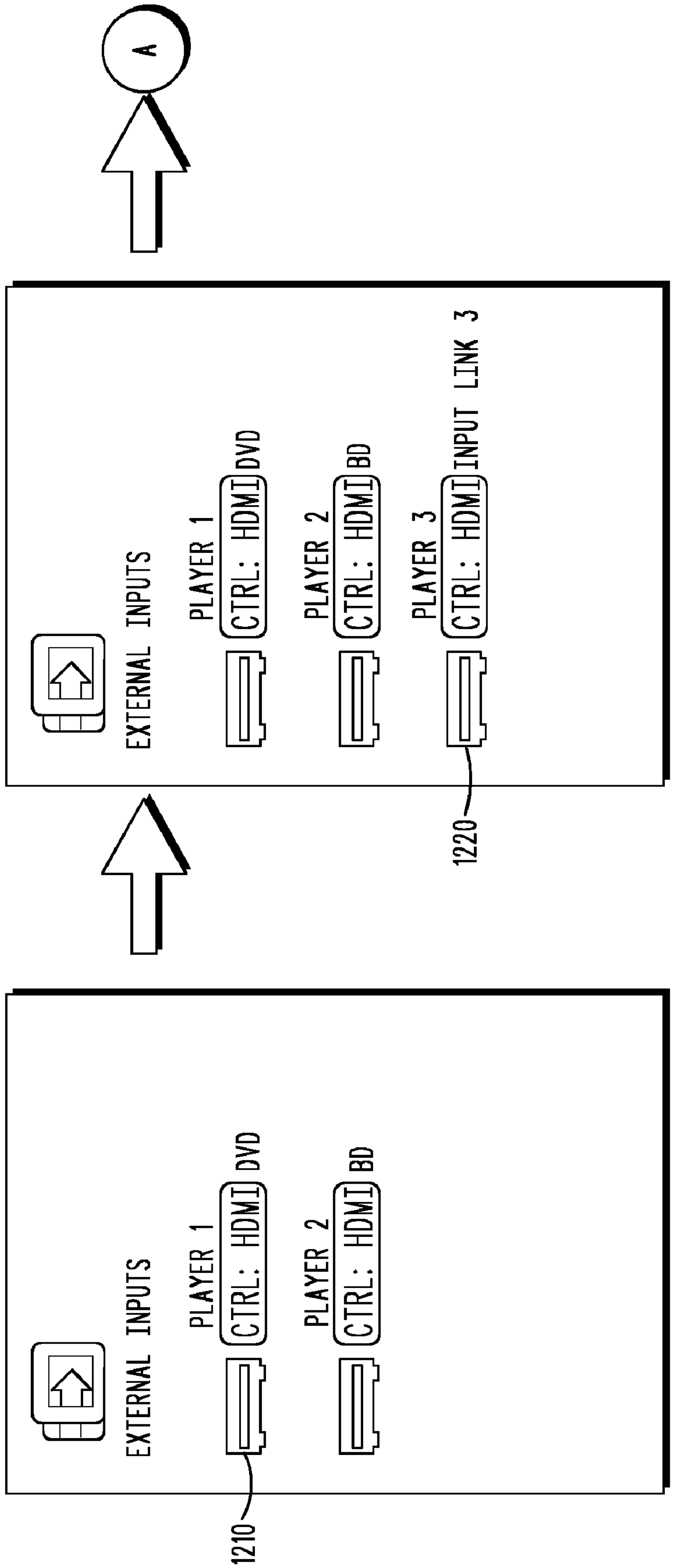
FIGS. 12A-12C illustrate an example of multiple CEC enabled devices coupled to an HDMI switcher, then multiple non-CEC enabled devices coupled to the HDMI switcher, in accordance with various embodiments.
Figure 12C:
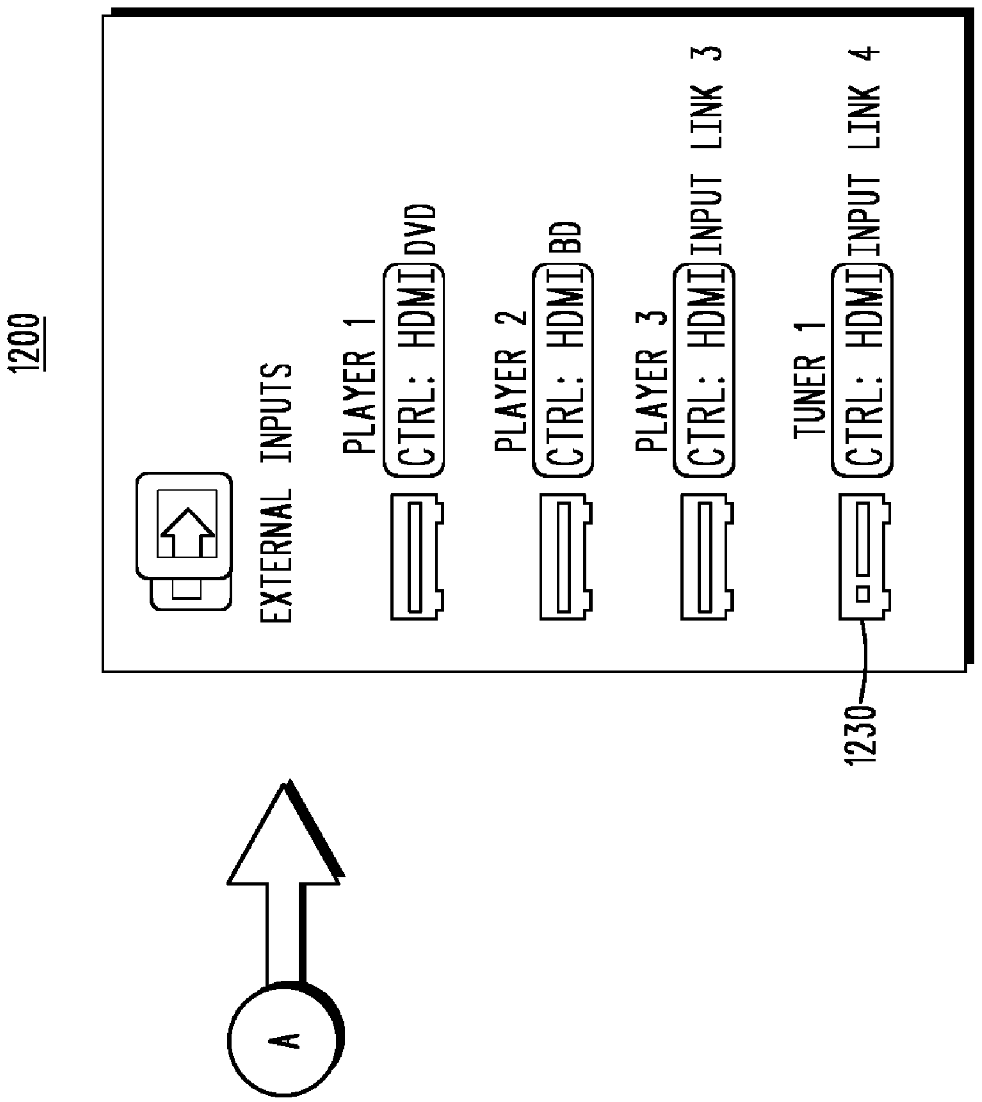

Next consider the usage example of FIGS. 12A-12C in which multiple CEC enabled devices are coupled to an HDMI switcher, followed by multiple non-CEC enabled devices coupled to the HDMI switcher, in accordance with various embodiments. In this example, the television as two CEC enabled player devices, such as a DVD and a Blu-Ray, connected directed to the television, at 1210 in FIG. 12A. In FIG. 12B, a user connects the HDMI switching module to the television and then attaches a non-CEC device to HDMI input port 3 (HDMI3), a player port, at 1220. Next, in FIG. 12C, the user attaches another non-CEC enabled device to input port 4 (HDMI4) of the HDMI switching module at 1230. While Port 4's default device type may be a "player" type, there are already three player devices at HDMI Ports 1-3, the maximum number of player logical addresses allowed by the specification. The fourth device, then, must take the next available address, which is Tuner 1 (logical address 3) and not a player type device address.

Figures 13A, 13B:
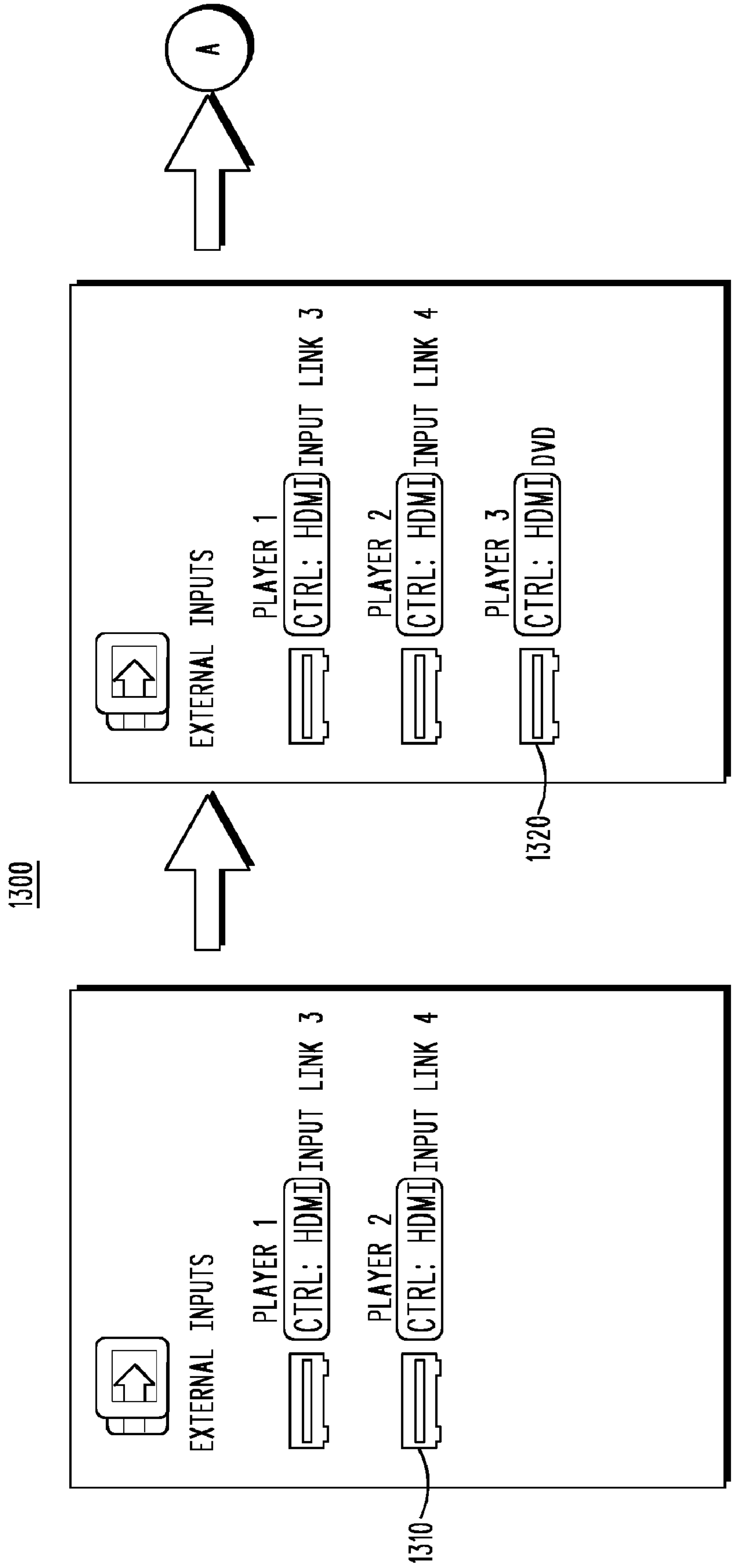
FIGS. 13A-13C illustrate an example of multiple non-CEC enabled devices coupled to an HDMI switcher, then multiple CEC enabled devices coupled to the HDMI switcher, with no available type specific addresses available for the later coupled CEC enabled device(s), in accordance with various embodiments.
Figure 13C:
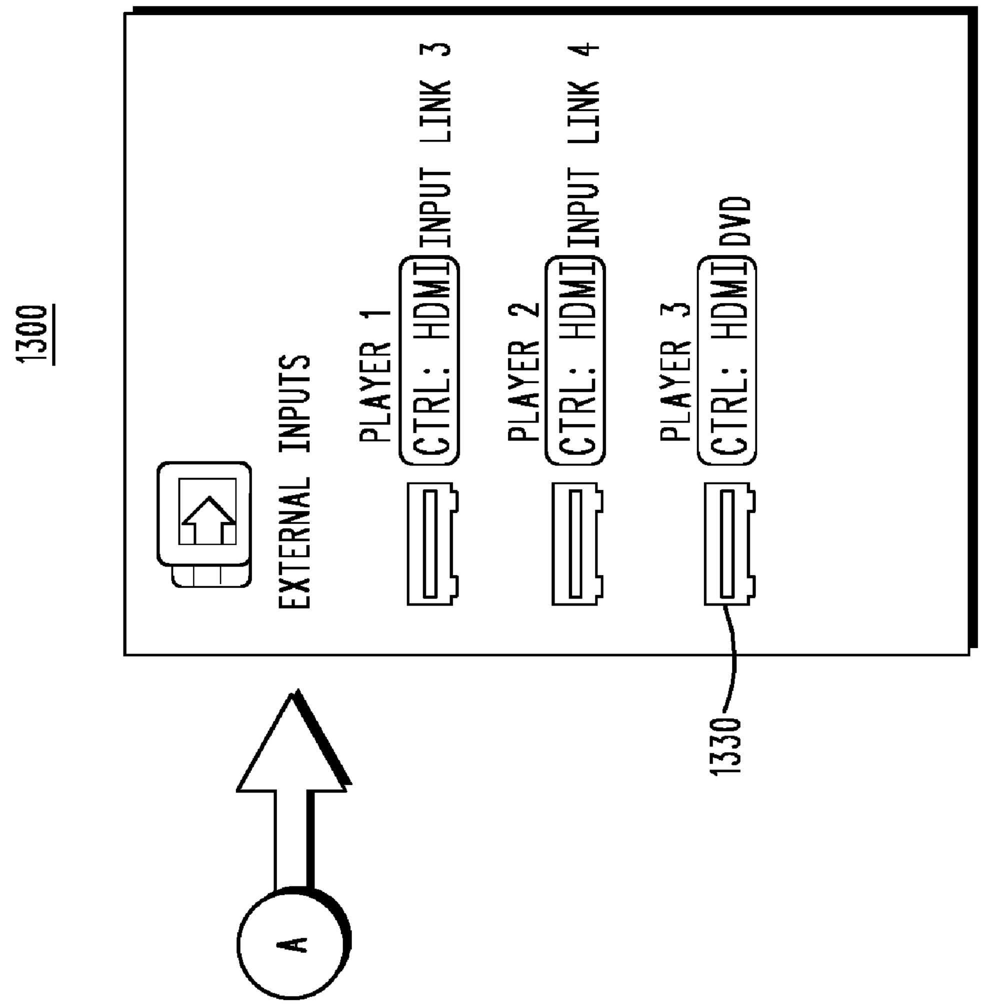

FIGS. 13A-13C illustrate an example of multiple non-CEC enabled devices coupled to an HDMI switcher, then multiple CEC enabled devices coupled to the HDMI switcher, with no available type specific addresses available for the later coupled CEC enabled device(s), in accordance with various embodiments. In FIG. 13A, the user connects the HDMI switching module to the television with two non-CEC enabled devices attached to HDMI input ports 3 and 4, player ports, 1310. Next at 1320 in FIG. 13B, the user connects a DVD CEC enabled player device to the HDMI switching module and then connects another DVD CEC enabled player device at 1330 of FIG. 13C. Since the user initially coupled two non-CEC devices to player ports 3 and 4, and the HDMI protocol only allows three player devices, the last connected CEC enabled player device, at 1330, must take an unregistered address and would not be shown on the TV menu display screen. As previously discussed, a CEC enabled device would poll the logical addresses of the CEC bus to which the HDMI switching module is coupled first for those logical addresses corresponding to its device type, but if non are available, the CEC enabled device would then have to take the HDMI unregistered logical address, as illustrated in this example.

Figure 14:
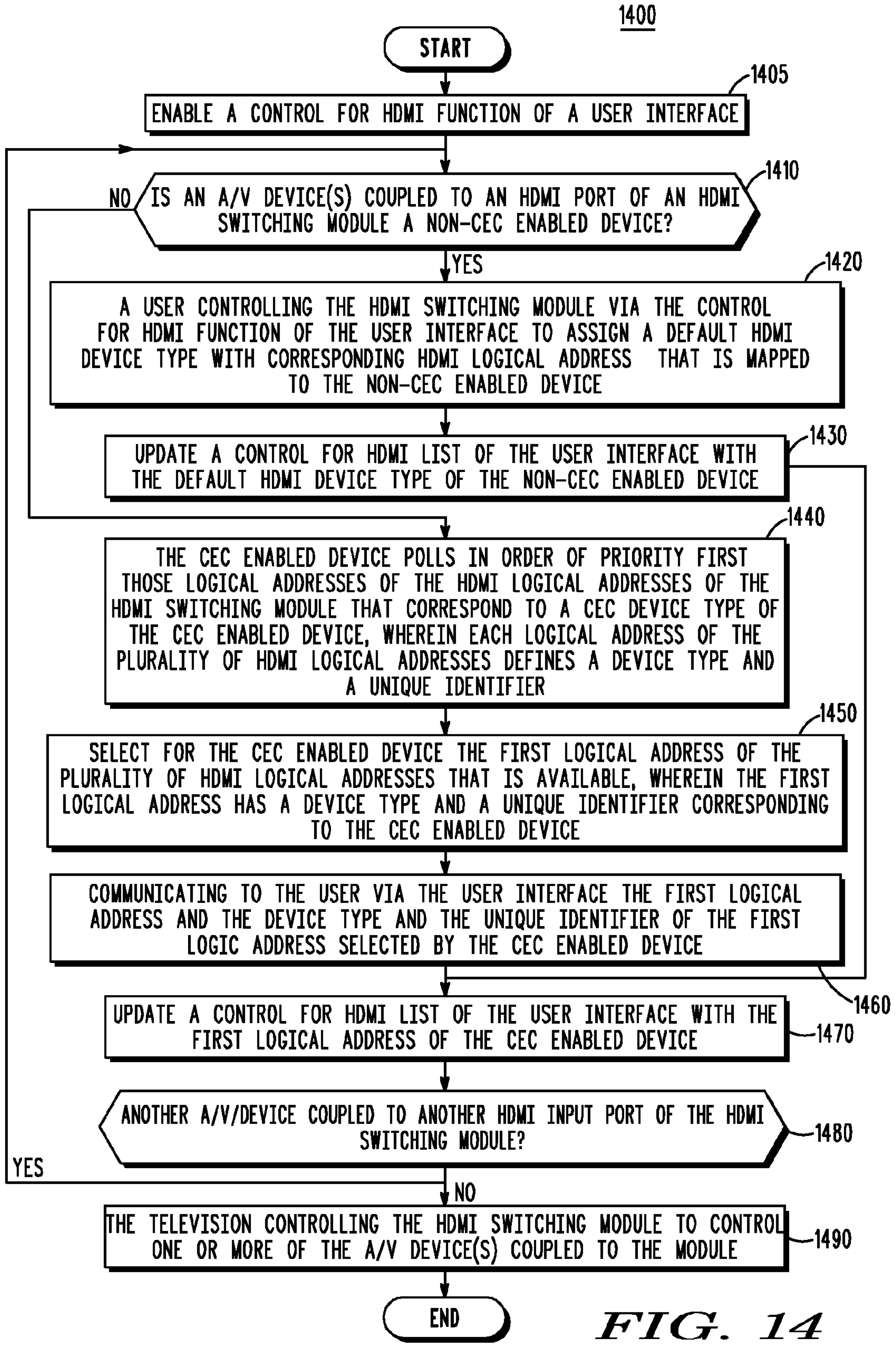
FIG. 14 is a flowchart of a method for facilitating communications between a television and multiple HDMI input devices, in accordance with various embodiments.

Referring now to flow 1400 of FIG. 14, a control for HDMI function of the user interface of the television is enabled at Block 1405. The initial setup and update with regard to the control for HDMI function of the user interface is described below in connection with FIGS. 15A-E and 16A-C below.

At Block 1410 the inquiry is whether an A/V device of one or more A/V devices coupled to HDMI port(s) of the HDMI switching module is a non-CEC enabled device. If yes, the flow continues to Block 1420, where a user controls the HDMI switching module via the control for HDMI function of the user interface to assign a default HDMI device type with corresponding HDMI logical address that is mapped to the non-CEC enabled device. This may be accomplished by the user selecting the HDMI input port and setting a default HDMI device type having a corresponding HDMI logical address that is mapped to the non-CEC enabled device, as previously described. The user may select and set using a user interface of the HDMI switching module or of the television, as has been described. At Block 1430, a control for HDMI list of the user interface is updated with the default HDMI device type of the non-CEC enabled device. The flow next goes to Block 1480 to ask whether there is another A/V device coupled to another HDMI input port of the HDMI switching module. If yes, then flow returns to Block 1410. If no, then the flow continues to Block 1490. The television controls the HDMI switching module to control the A/V device coupled to the module, as indicated at Block 1490. This control may occur at any time within the flow. The television may display the set default HDMI device type of the non-CEC enabled device on a TV menu screen displayed to the user.

If an A/V device coupled to an HDMI input port is not a non-CEC enabled device, i.e. a CEC enabled device, then the flow goes from Block 1410 to Block 1440. At Block 1440, the CEC enabled device polls in order of priority first those logical addresses of a plurality of HDMI logical addresses that correspond to a CEC device type of the CEC enabled device, wherein each logical address of the plurality of HDMI logical addresses defines a device type and a unique identifier and then selects for the CEC enabled device the first logical address of the plurality of HDMI logical addresses that is available, wherein the first logical address has a device type and a unique identifier corresponding to the CEC enabled device at Block 1450. At Block 1460, the first logic address and the device type and the unique identifier of the first logic address selected by the CEC enabled device are communicated to the television. At Block 1470, the control for HDMI list of the user interface is updated with the first logical address of the CEC enabled device. The flow next goes to Decision Blocks 1480 and 1490, previously described.

With regard to the initial setup and update of the control for HDMI function of the user interface of the TV, consider the following discussion in conjunction with FIGS. 15A-E and 16A-C below. Setting up the user interface control for HDMI function may be performed when the HDMI switching module is used for the first time, when power is lost or disconnected from the television or the HDMI switching module link, when new A/V devices are connected to and existing HDMI inputs of the HDMI switching module are changed, and when the HDMI switching module is connected to a different HDMI INPUT port on the television.

Before beginning the setup of the HDMI switching module, the various components of the system may be powered on in the following fashion: the A/V devices (HDMI equipment) is powered ON, the television is powered ON, the HDMI OUT port of the HDMI switching module is connected to a HDMI IN port of the television using an appropriate HDMI cable, the A/V devices are connected to the HDMI switching module, and the DHMI switching module is powered ON. A nominal period of time, such as 90 seconds, elapses before the HDMI switching module and the A/V devices connect to the television.

Figure 15A:
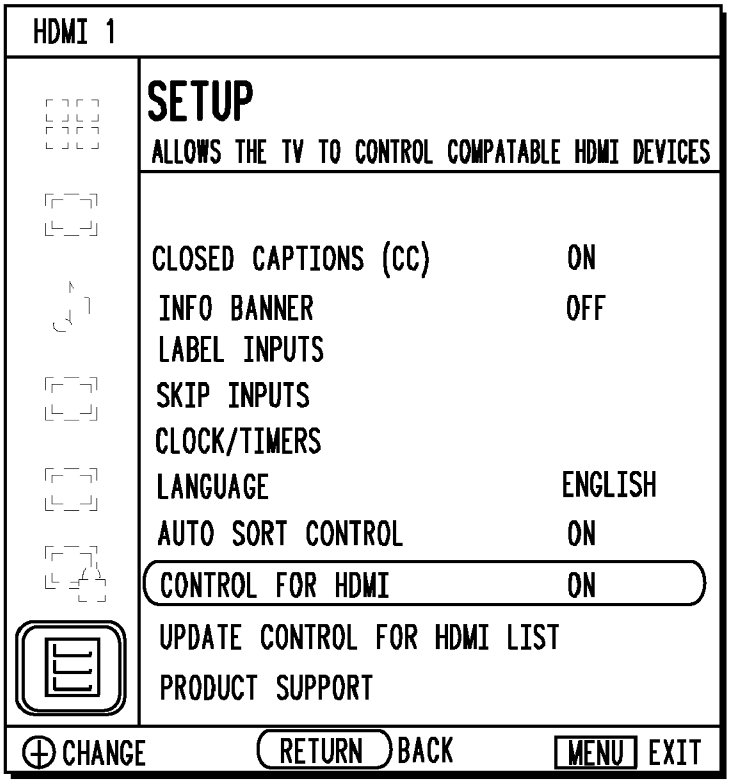
FIGS. 15A-15E illustrate control for HDMI function operation for user interface employing a panel menu, in accordance with various embodiments.
Figure 16A:
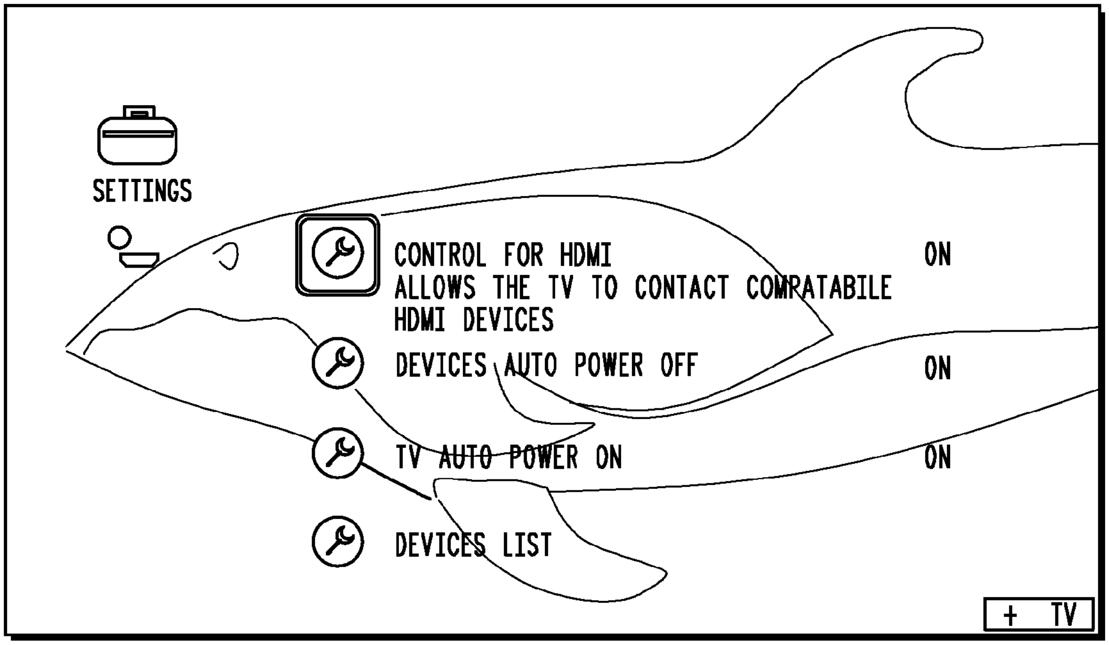
FIGS. 16A-16C illustrate control for HDMI function operation for user interface employing an XMB graphical user interface, in accordance with various embodiments.
Figure 16B:
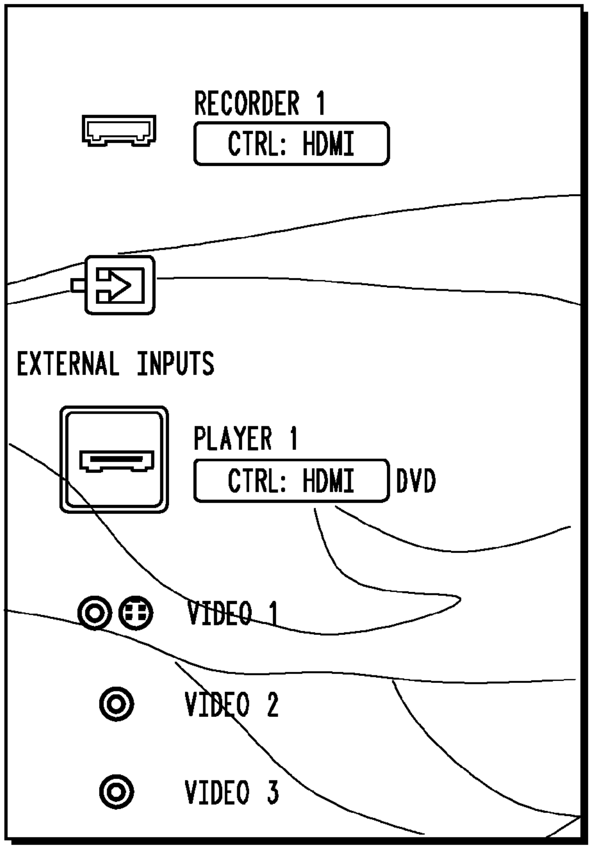
Figure 16C:
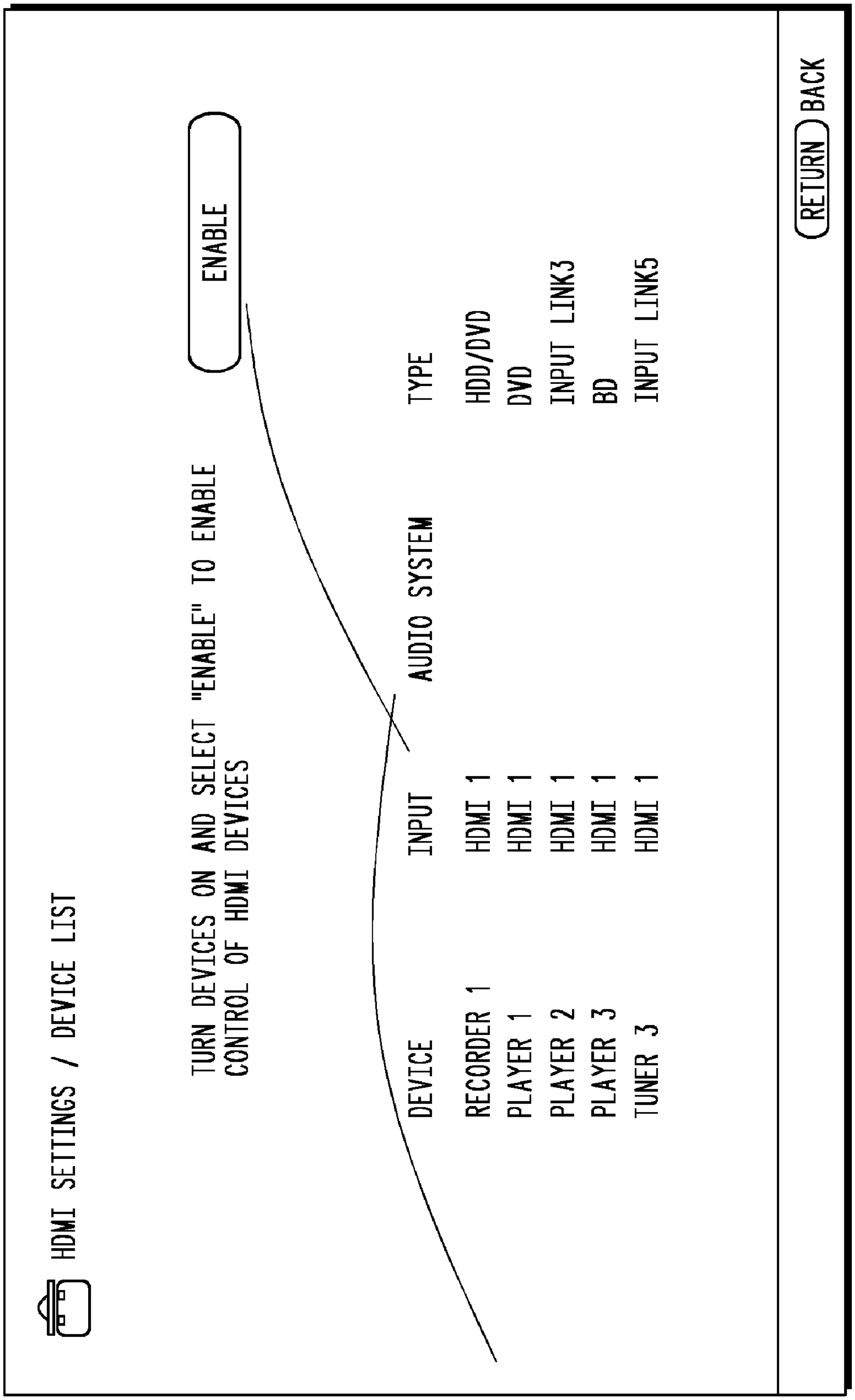

The control for HDMI function of the user interface, accessed by the user through a remote control or commander, for example, is enabled. FIG. 15A illustrates an example of how a television employing a panel menu user interface permits this function to be enabled. Or, a television employing a graphical user interface, such as XMB, might enable the control for HDMI function to be enabled as illustrated in FIG. 16A. FIG. 16C illustrates that the control for HDMI function may be enabled for each device coupled to the HDMI switching module, also in a XMB example.

Figure 15B:
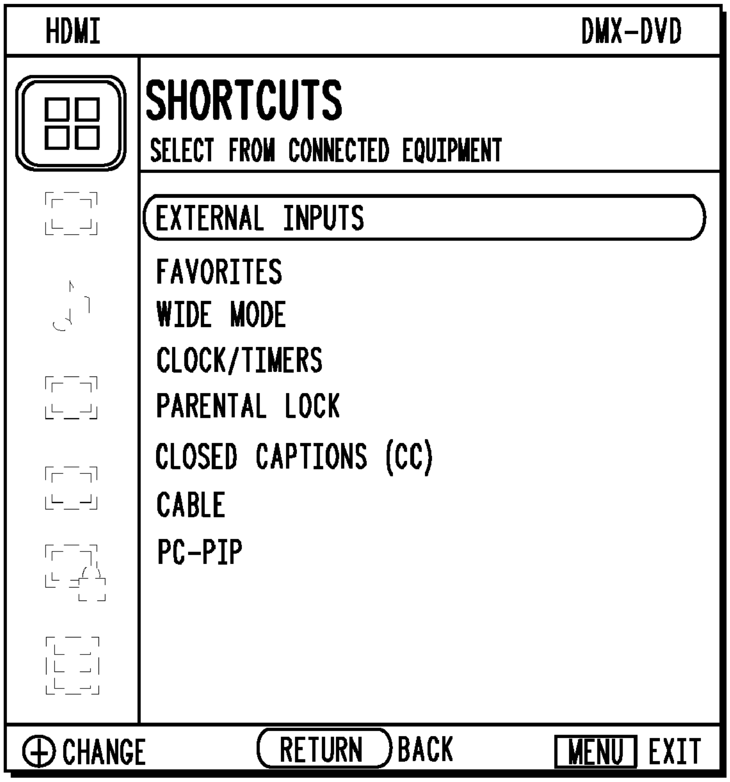
Figure 15C:
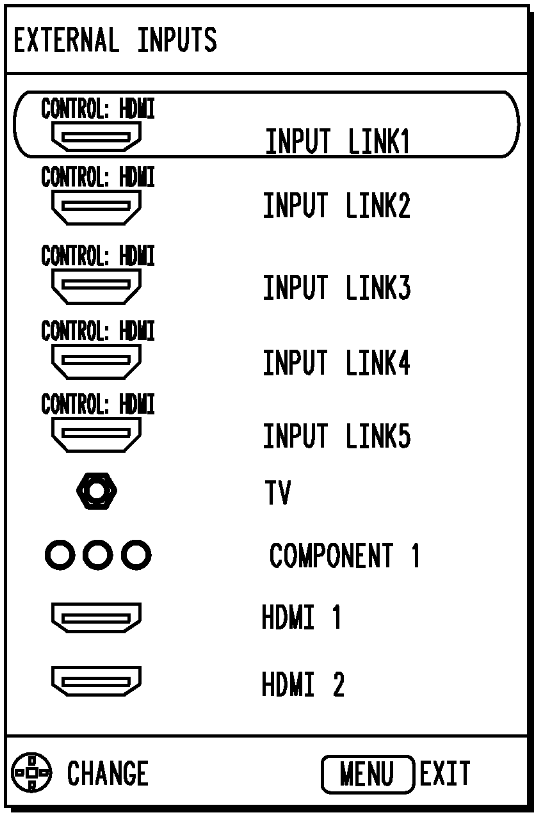
Figure 15D:
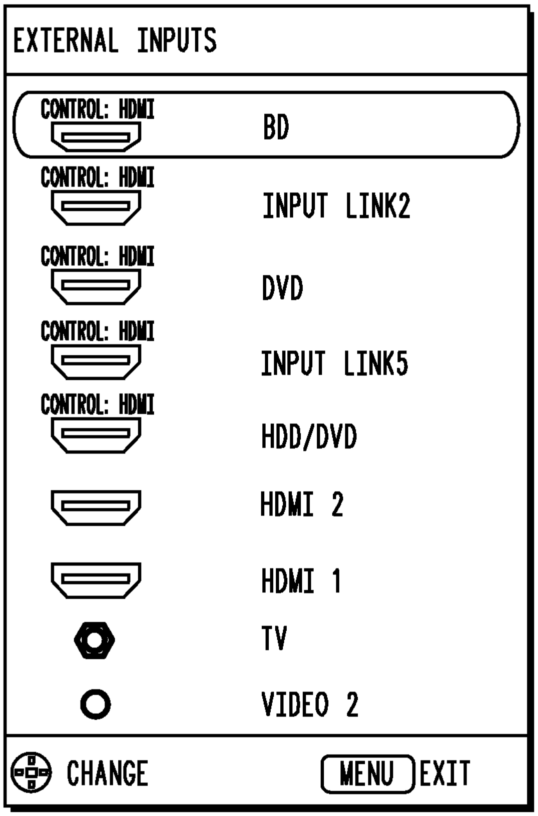

Next, the initial setup of the HDMI switching module calls for the External Inputs portion of the user interface to be accessed. If a panel menu is being employed, then FIG. 15B illustrates an example of selecting External Inputs from connected equipment. The arrow keys of a remote controller may be used to navigate to the External Inputs menu. Once External Inputs of FIG. 15B is selected, then the desired device or equipment may be highlighted and then selected with the input link label from a control for HDMI list. This illustrated in FIG. 15C for a panel menu style user interface. FIG. 16B illustrates how External Inputs of a XMB user interface may be accessed. The arrow keys of a remote controller may be used to navigate to the External Inputs menu. Both FIGS. 15D and 16B illustrate how devices connected to the HDMI switching module/link may be access to verify an HDMI connection.

Figure 15E:
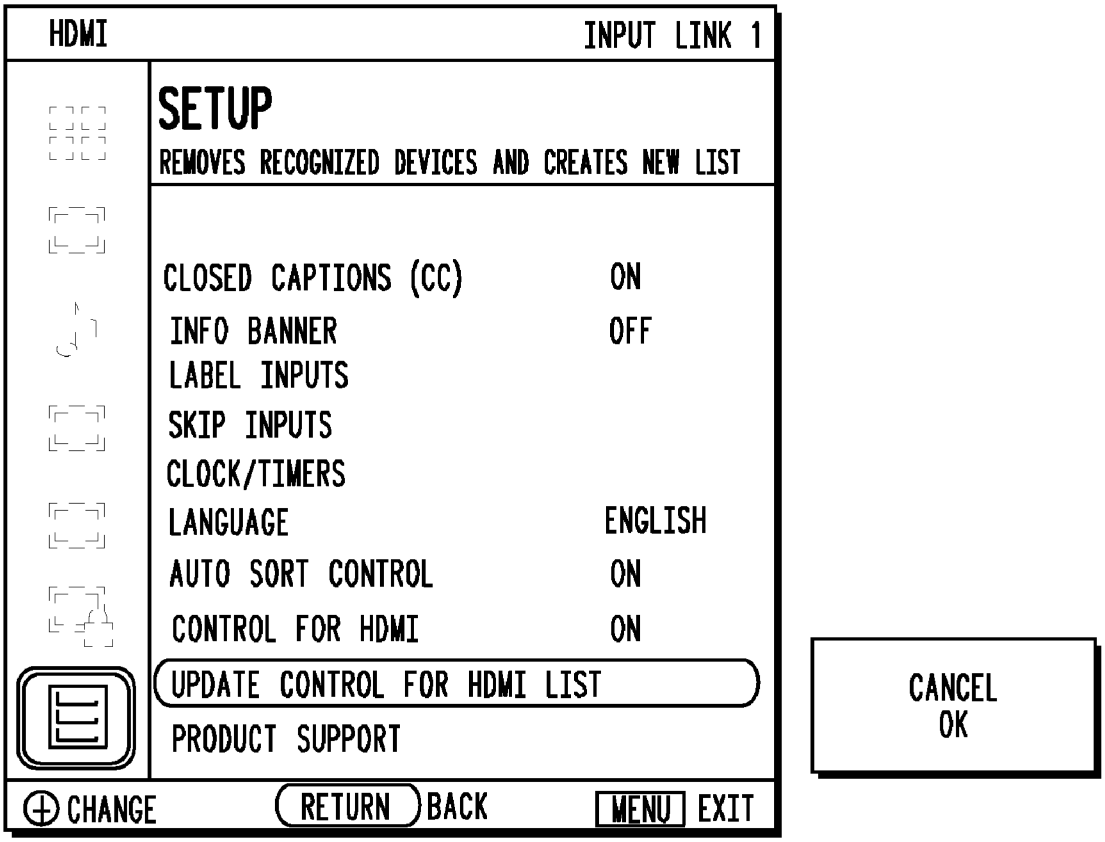

The control for HDMI list may be updated for the control for HDMI function of the user interface. For a user interface using XMB, FIG. 16C illustrates how the control for HDMI device list may be enabled or updated. In FIG. 15E, updating control for HMDI list is illustrated in the panel menu example. Once the control for HDMI list is updated, the "input link" is removed for devices that support control for HDMI and only the pre-assigned labels are displayed, e.g. DVD, BD, etc. This is illustrated in FIGS. 8A, 8B, 11C, 11D, 12A, 12B, 12C, 13B, 13C, 15D, 16B, 16C, for example.

In accordance with the various embodiments, it has been described that a HDMI switching module is operable to work with both CEC and non-CEC enabled devices allows devices of both types to be coupled to a television. The HDMI switcher is able to act as a CEC proxy for non-CEC enabled devices that will assign a device type (Player, Recorder, Tuner) and send that identity to the television via the HDMI output port. The TV can then control the HDMI switching module and select the appropriate HDMI input port; neither the TV nor the HDMI switching module actually controls the device(s). This allows the user to correctly identify their device types by allowing them to assign via a user interface default device types for each device that is coupled to the HDMI switching module. Any non-CEC enabled device attached to the input will be identified as a default device type regardless of its actual type. This enables the television to select HDMI inputs corresponding to non-CEC enabled devices. Moreover, if an attached CEC enabled device takes an unregistered address, due to too many of that device type already attached to HDMI input ports corresponding to certain HDMI logical addresses, it is possible to assign a default device type based on the specific input to which it is attached.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A high definition multimedia interface (HDMI) switching module operable to facilitate communications between one or more non-CEC enabled devices and a television of an audio/visual (A/V) system, comprising:

- a plurality of HDMI input ports each suitable to be coupled to the one or more non-CEC enabled devices;
- a programmed processor that controls operation of the HDMI switching module and receives information about any of the one or more non-CEC enabled devices when the one or more non-CEC enabled devices are coupled to the plurality of HDMI input ports;

an HDMI output port controlled by the programmed processor and operable to be coupled to the television, wherein in response to user control of a select and set element of a user interface, an HDMI input port of the plurality of HDMI input ports to which a non-CEC enabled device of the one or more non-CEC enabled devices is coupled is selected and a default HDMI device type having a corresponding HDMI logic address that is mapped to the non-CEC enabled device is set using a select/set button of the select and set element, and wherein the HDMI output port is controlled by the programmed processor to output the set default HDMI device type of the non-CEC enabled device coupled to the HDMI input port and enable communication between the non-CEC enabled device and the television.

2. The switching module of claim 1, wherein the HDMI switching module is further operable to facilitate communications between one or more CEC enabled devices and the television and wherein a CEC enabled device of the one or more CEC enabled devices coupled to a second HDMI input port of the plurality of HDMI input ports polls a plurality of HMDI logical addresses in priority order of first those logical addresses of the plurality of HDMI logical addresses that correspond to a CEC device type of the CEC enabled device, selects for the CEC enabled device the first logical address of the plurality of HDMI logical addresses that is available, and the programmed processor controls the HDMI output port to output the first logic address and a logical device type of the first logic address selected by the CEC enabled device.

3. The switching module of claim 2, wherein when no logical addresses of the plurality of HDMI logical addresses correspond to a device type of the CEC enabled device, the first logical address is an unregistered HDMI logical address of the HDMI switching module.

4. The switching module of claim 1, wherein the user interface is controlled by a remote commander operated by a user.

5. The switching module of claim 1, wherein the user interface comprises a plurality of HDMI indicators corresponding to the plurality of HMDI input ports, and user manipulation of the select and set element is reflected in the plurality of HDMI indicators.

6. The switching module of claim 1, wherein the HDMI switching module comprises one or more of a set-top box and a set-back box.

7. The switching module of claim 1, wherein the one or more non-CEC enabled devices types comprise one or more of a player device type, a recorder device type, and a tuner device type.

8. A high definition multimedia interface (HDMI) switching module operable to facilitate communications between one or more non-CEC enabled devices and a television of an audio/visual (A/V) system, comprising:

a plurality of HDMI input ports each suitable to be coupled to the one or more non-CEC enabled devices;

a programmed processor that controls operation of the HDMI switching module and receives information about any of the one or more non-CEC enabled devices when the one or more non-CEC enabled devices are coupled to the plurality of HDMI input ports;

an HDMI output port controlled by the programmed processor and operable to be coupled to the television, wherein in response to user control of a select and set element of a user interface, an HDMI input port of the plurality of HDMI input ports to which a non-CEC enabled device of the one or more non-CEC enabled devices is coupled is selected and a default HDMI device type having a corresponding HDMI logic address that is mapped to the non-CEC enabled device is set, wherein the user interface is an element of the switching module and the select and set element is a toggle button of the HDMI switching module, and wherein the HDMI output port is controlled by the programmed processor to output the set default HDMI device type of the non-CEC enabled device coupled to the HDMI input port.

9. The switching module of claim 8, wherein the user sets the HDMI device type of the non-CEC by holding the toggle button for a predetermined period of time in a position of the toggle button corresponding to the HDMI device type.

10. An audio/visual (A/V) system operable to facilitate communications between multiple high definition multimedia interface (HMDI) input devices and television of the audio/visual system, comprising:

a television;

one or more non-CEC enabled devices;

a HDMI switching module operable to facilitate communications between the one or more non-CEC enabled devices and the television in accordance with user control of the HDMI switching module;

wherein in response to user control of a user interface, an HDMI input port of the HDMI switching module is selected and a default HDMI device type and corresponding HDMI logic address is set for each non-CEC enabled device of the one or more non-CEC enabled devices using a select/set button of the user interface and the HDMI switching module outputs the default HDMI device type of the non-CEC enabled device to the television, which displays the non-CEC enabled device, and communication between the non-CEC enabled device and the television is enabled.

11. The system of claim 10, the system further comprising one or more CEC enabled devices, wherein a CEC enabled device of the one or more CEC enabled devices coupled to an HDMI input port of the HDMI switching module polls a plurality of HMDI logical addresses in priority order of first those logical addresses of the plurality of HDMI logical addresses that correspond to a CEC device type of the CEC enabled device, selects the first logical address of the plurality of HDMI logical addresses that is available, and the programmed processor controls the HDMI output port to output the first logic address and a logical device type of the first logic address selected by the CEC enabled device.

12. The system of claim 10, wherein the HDMI switching module further comprises:

a plurality of HDMI input ports each suitable to be coupled to the one or more non-CEC enabled devices;

a programmed processor that controls operation of the HDMI switching module and receives information about any of the one or more non-CEC enabled devices when the one or more non-CEC enabled devices are coupled to the plurality of HDMI input ports;

a user interface, having a select and set element and controlled by a software segment running on the programmed processor, wherein the select and set element in response to user manipulation selects an HDMI input port of the plurality of HDMI input ports to which a non-CEC enabled device of the one or more non-CEC enabled devices is coupled and sets a default HDMI device type having a corresponding HDMI logic address that is mapped to the non-CEC enabled device; and an HDMI output port controlled by the programmed processor to output the set default HDMI device type of the non-CEC enabled device coupled to the HDMI input port, wherein the HDMI output port is operable to be coupled to the television.

13. The system of claim 10, wherein the television further comprises a user interface having a select and set element and wherein in response to user control of the select and set element of the user interface, an HDMI input port of the plurality of HDMI input ports to which a non-CEC enabled device of the one or more non-CEC enabled devices is coupled is selected and a default HDMI device type having a corresponding HDMI logic address that is mapped to the non-CEC enabled device is set.

14. A method for facilitating communications between a plurality of audio/visual devices and a television of an audio/visual (A/V) system, comprising:

for a non-CEC enabled device of one or more non-CEC enabled devices of the plurality of audio/visual devices coupled to an HDMI input port of a plurality of HDMI input ports of a HDMI switching module:

a user controlling the HDMI switching module via a control for HDMI function of a user interface to assign a default HDMI device type with corresponding HDMI logical address that is mapped to the non-CEC enabled device, the user using a select/set button of a select and set function of the user interface of the HDMI switching module and communication between the non-CEC enabled device and the television enabled; and updating a control for HDMI list of the user interface with the default HDMI device type of the non-CEC enabled device.

15. The method of claim 14, wherein the television displays the set default HDMI device type of the non-CEC enabled device on a TV menu screen displayed to the user.

16. The method of claim 14, further comprising:

for a CEC enabled device of one or more CEC enabled devices of the plurality of audio/visual devices coupled to the HDMI input port of the plurality of HDMI input ports of the HDMI switching module:

polling in order of priority first those logical addresses of a plurality of HDMI logical addresses that correspond to a CEC device type of the CEC enabled device, wherein each logical address of the plurality of HDMI logical addresses defines a device type and a unique identifier;

selecting for the CEC enabled device the first logical address of the plurality of HDMI logical addresses that is available, wherein the first logical address has a device type and a unique identifier corresponding to the CEC enabled device; and communicating to the user via the user interface the first logic address and the device type and the unique identifier of the first logic address selected by the CEC enabled device.

17. The method of claim 16, further comprising:

when all HDMI logical addresses corresponding to the device type of the CEC enabled device are not available, selecting for the CEC enabled device a logical address of the plurality of HDMI logical addresses that does not correspond to the CEC device type;

communicating to the user via the user interface that the logic address that does not correspond to the CEC device type and a logical device type of the logic address selected by the CEC enabled device; and the television displaying the CEC enabled device.

18. The method of claim 17, wherein the television displays the CEC enabled device on a TV menu screen of the user interface displayed to the user.

19. The method of claim 16, further comprising:

updating the control for HDMI list of the user interface with the logical address of the CEC enabled device.

20. The method of claim 14, further comprising the television controlling the HDMI switching module to control operation of one or more of the plurality of audio/visual devices.

21. The method of claim 14, further comprising the television displaying the set default HDMI device type of the non-CEC enabled device.

22. The method of claim 14, wherein the user interface is of the television.

* * * * *